(12) United States Patent
Trani

(10) Patent No.: US 9,947,155 B2
(45) Date of Patent: *Apr. 17, 2018

(54) FRICTIONLESS ACCESS SYSTEM FOR PUBLIC ACCESS POINT

(71) Applicant: Sensormatic Electronics, LLC, Boca Raton, FL (US)

(72) Inventor: James Trani, Billerica, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/160,765

(22) Filed: May 20, 2016

(65) Prior Publication Data

US 2016/0343187 A1 Nov. 24, 2016

Related U.S. Application Data

(60) Provisional application No. 62/164,054, filed on May 20, 2015, provisional application No. 62/181,434, (Continued)

(51) Int. Cl.
G07C 9/00 (2006.01)
H04W 4/02 (2018.01)
(Continued)

(52) U.S. Cl.
CPC .......... *G07C 9/00119* (2013.01); *G06F 21/32* (2013.01); *G07C 9/00007* (2013.01);
(Continued)

(58) Field of Classification Search
CPC ............ G07C 9/00119; G07C 9/00079; G07C 9/00007; H01Q 1/243; H01Q 1/3241;
(Continued)

(56) References Cited

U.S. PATENT DOCUMENTS 7,035,650 B1 * 4/2006 Moskowitz ............ G01C 21/20
340/995.23
8,009,013 B1 * 8/2011 Hirschfeld ......... G07C 9/00103
235/375
(Continued)

FOREIGN PATENT DOCUMENTS

| EP | 1981183 A2 | 10/2008 |
|---|---|---|
| GB | 2468731 A | 9/2010 |
| WO | 9606409 A1 | 2/1996 |

OTHER PUBLICATIONS

International Search Report and Written Opinion of the International Searching Authority, dated Sep. 5, 2016, from International Application PCT/US2016/033600, filed May 20, 2016. Twelve pages.

(Continued)

*Primary Examiner* — Leon Flores
(74) *Attorney, Agent, or Firm* — HoustonHogle LLP

(57) ABSTRACT

An access control system and method for monitoring a public access point are disclosed. The system includes a positioning unit that tracks locations of users carrying user devices relative to the public access point, where the user devices transmit user information identifying the users via wireless signals. The system determines whether the users are authorized to pass through the access point based on the wireless signals from the user devices. Public access points include security checkpoints at government buildings, airports, amusement parks, and universities, in examples. In embodiments, biometric identifiers are obtained from the users when the users are preferably located within a threshold area of the public access points, and the system confirms the identity of the authorized users via the biometric identifiers to enable the users to pass through the public access points. Additionally, the system can assist in evacuation of users based on their tracked locations.

31 Claims, 15 Drawing Sheets

Related U.S. Application Data filed on Jun. 18, 2015, provisional application No. 62/185,349, filed on Jun. 26, 2015, provisional application No. 62/193,907, filed on Jul. 17, 2015.

(51) Int. Cl.
  *G06F 21/32* (2013.01)
  *H01Q 1/24* (2006.01)
  *H01Q 1/36* (2006.01)
  *H01Q 9/04* (2006.01)
  *H04W 4/00* (2018.01)
  *H04W 4/06* (2009.01)
  *H01Q 1/32* (2006.01)
  *H01Q 21/06* (2006.01)

(52) U.S. Cl.
  CPC ......... *G07C 9/00079* (2013.01); *H01Q 1/243* (2013.01); *H01Q 1/3241* (2013.01); *H01Q 1/36* (2013.01); *H01Q 9/0407* (2013.01); *H01Q 21/061* (2013.01); *H04W 4/008* (2013.01); *H04W 4/021* (2013.01); *H04W 4/06* (2013.01); *G07C 2209/04* (2013.01)

(58) Field of Classification Search
  CPC ........ H01Q 1/36; H04W 4/008; H04W 4/021; H04W 4/06; G06F 21/32
  See application file for complete search history.

(56) References Cited

U.S. PATENT DOCUMENTS

| | | | |
|---|---|---|---|
| 8,430,310 | B1 | 4/2013 | Ho et al. |
| 2004/0153671 | A1 | 8/2004 | Schuyler et al. |
| 2005/0062649 | A1 | 3/2005 | Chiang et al. |
| 2006/0270458 | A1 | 11/2006 | Watanabe |
| 2006/0279422 | A1 | 12/2006 | Sweatte |
| 2007/0109111 | A1 | 5/2007 | Breed et al. |
| 2008/0285802 | A1 | 11/2008 | Bramblet et al. |
| 2010/0094482 | A1 | 4/2010 | Schofield et al. |
| 2010/0194566 | A1 | 8/2010 | Monden |
| 2011/0314539 | A1 | 12/2011 | Horton |
| 2011/0316703 | A1 | 12/2011 | Butler et al. |
| 2012/0040650 | A1 | 2/2012 | Rosen |
| 2012/0062422 | A1 | 3/2012 | Wu et al. |
| 2012/0062427 | A1 | 3/2012 | Wu |
| 2012/0154115 | A1* | 6/2012 | Herrala ............... G07C 9/00111 340/5.64 |
| 2012/0202560 | A1 | 8/2012 | Donaldson |
| 2012/0242481 | A1 | 9/2012 | Gemandt et al. |
| 2012/0280783 | A1 | 11/2012 | Gerhardt et al. |
| 2012/0330849 | A1 | 12/2012 | Nielsen et al. |
| 2013/0002399 | A1 | 1/2013 | Frueh |
| 2013/0138314 | A1 | 5/2013 | Viittala et al. |
| 2013/0149991 | A1 | 6/2013 | Hepo-Oja |
| 2013/0176107 | A1* | 7/2013 | Dumas ............... G07C 9/00571 340/5.61 |
| 2013/0214898 | A1 | 8/2013 | Pineau et al. |
| 2013/0237193 | A1 | 9/2013 | Dumas et al. |
| 2013/0237272 | A1 | 9/2013 | Prasad |
| 2014/0015978 | A1 | 1/2014 | Smith |
| 2014/0077929 | A1 | 3/2014 | Dumas et al. |
| 2014/0129006 | A1 | 5/2014 | Chen et al. |
| 2014/0167912 | A1 | 6/2014 | Snyder et al. |
| 2014/0183269 | A1 | 7/2014 | Glaser |
| 2014/0197989 | A1 | 7/2014 | Hepo-Oja |
| 2014/0201537 | A1 | 7/2014 | Sampas |
| 2014/0240088 | A1 | 8/2014 | Robinette et al. |
| 2014/0253326 | A1* | 9/2014 | Cho .................. H04W 4/22 340/539.13 |
| 2014/0266585 | A1 | 9/2014 | Chao et al. |
| 2015/0071274 | A1 | 3/2015 | Sugar et al. |
| 2015/0348220 | A1 | 12/2015 | Sharma et al. |
| 2016/0055692 | A1* | 2/2016 | Trani ................. G07C 9/00007 340/5.61 |

OTHER PUBLICATIONS

"Apriva Reader." Apriva. Retrieved from http://www.apriva.com/iss/solutions/apriva-reader. 2 pages. Dec. 2014.
"EK6 Bluetooth Proximity Reader: EK6 Installation Guide." EC Key. 2 pages. Mar. 2014.
EK6 Bluetooth Proximity Readers. EC Key, 2014. Retrieved from http://eckey.com/enterprise-access. 2 pages.
International Search Report and Written Opinion of the International Searching Authority, dated Oct. 28, 2015 from International Application PCT/US2015/043455, International Filing Date Aug. 3, 2015. Ten pages.
Martin, Zack. "Vodafone piloting emerging access control tech." SecureIDNews, Sep. 26, 2014. Retrieved from http://www.secureidnews.com/news-item/vodafone-piloting-emerging-access-control-tech. 2 pages.
International Search Report and Written Opinion of the International Searching Authority, dated Aug. 8, 2016 from International Application PCT/US2016/033597, International Filing Date May 20, 2016. Eleven pages.
International Preliminary Report on Patentability, dated Nov. 30, 2017, from International Application No. PCT/US2016/033597, filed on May 20, 2016. 7 pages.
Jonietz, Ericka, "Injecting Liquid Metal Into a Polymer Results in a Twistable, Stretchable Antenna," (2009).

* cited by examiner

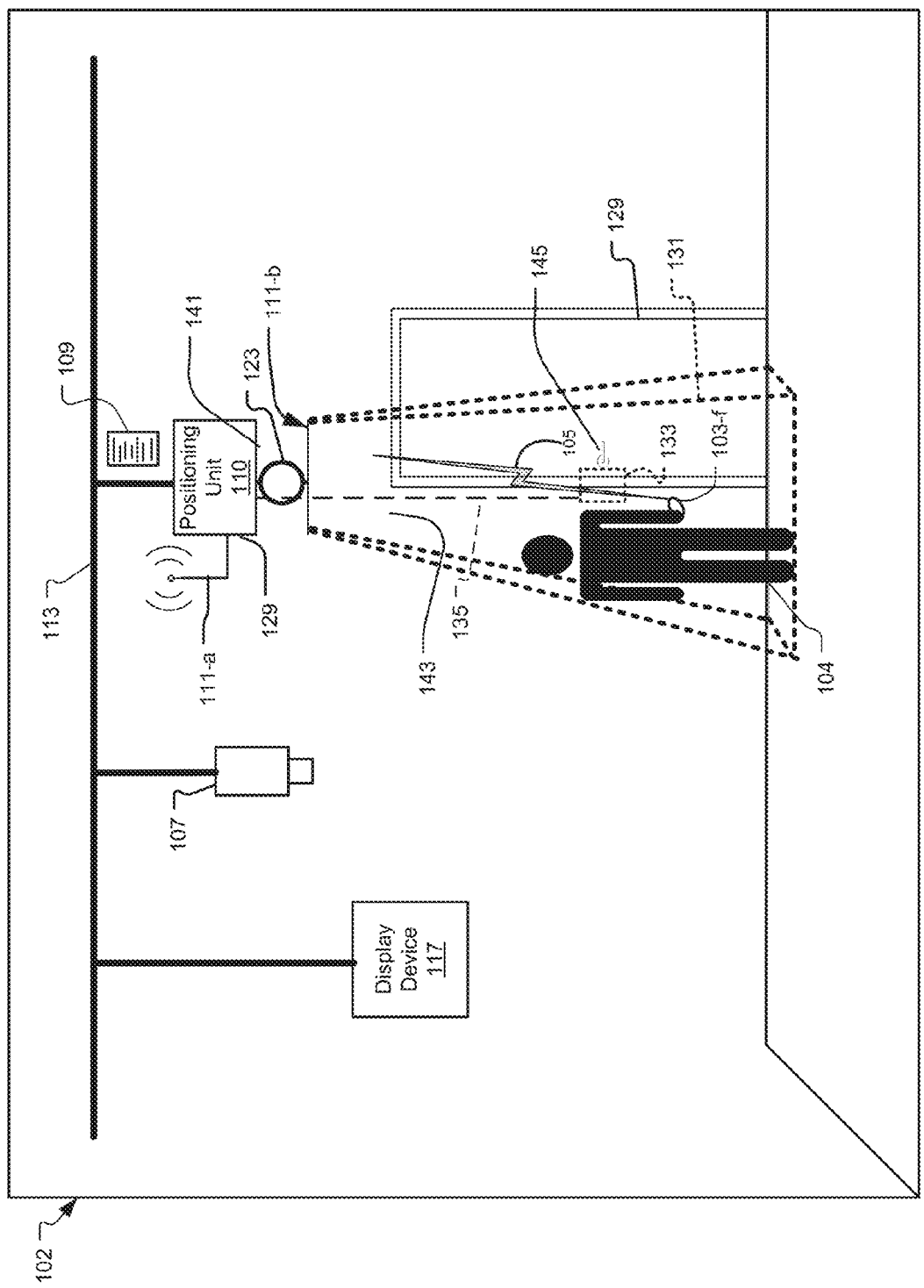

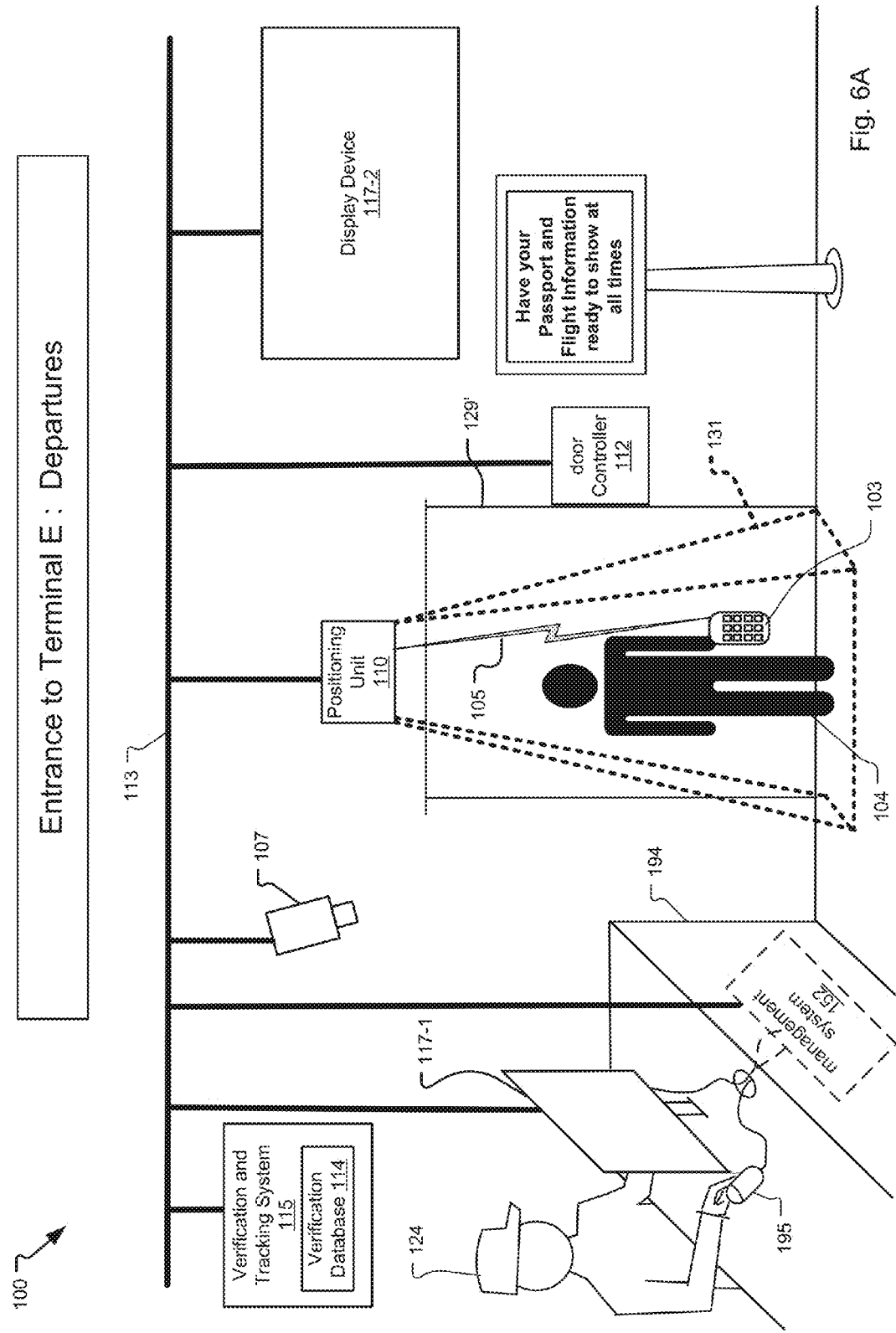

FRICTIONLESS ACCESS SYSTEM FOR PUBLIC ACCESS POINT

RELATED APPLICATIONS

This application claims the benefit under 35 USC 119(e) of U.S. Provisional Application No. 62/164,054, filed on May 20, 2015; 62/181,434, filed on Jun. 18, 2015; 62/185,349, filed on Jun. 26, 2015 and 62/193,907, filed on Jul. 17, 2015, all of which are incorporated herein by reference in their entirety.

This application is related to:

U.S. application Ser. No. 15/160,722, now U.S. Patent Publication No. US 2016-0284147 A1, filed on May 20, 2016, entitled "Access Control System with Omni and Directional Antennas," by James Trani;

U.S. application Ser. No. 15/160,736, now U.S. Patent Publication No. US 2016-0284183 A1, filed on May 20, 2016, entitled "Tailgating Detection in Frictionless Access Control System" by James Trani;

U.S. application Ser. No. 15/160,753, now U.S. Patent Publication No. US 2016-0267760 A1, filed on May 20, 2016, entitled "Video Recognition in Frictionless Access Control System," by James Trani; and U.S. application Ser. No. 15/160,775, now U.S. Patent Publication No. US 2016-0344091 A1, and International Application No. PCT/US16/033600, now International Publication No. WO 2016/187574, both filed on May 20, 2016, entitled "Portable Device having Directional BLE Antenna," by James Trani.

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control readers, video surveillance cameras, network video recorders (NVRs), and door controllers, to list a few examples.

The access control readers are often installed at access points of the buildings to control access to restricted areas, such as buildings or areas of the buildings. Examples of access points include front and interior doors of a building, elevators, hallways connecting two areas of a building, to list a few examples. The access control readers authenticate identities of (or authorize) individuals and then permit those authenticated individuals to access the restricted areas through the access points. Typically, individuals interact with the access control readers by swiping keycards or bringing contactless smart cards within range (approximately 2-3 inches or 5 centimeters) of a reader. The access control readers read the information of the keycards and then the access control systems determine if the individuals are authorized to access the restricted areas. If the individuals are authorized to enter the restricted areas, then the access control readers allow access to the restricted areas by unlocking locked doors, signaling that doors should be unlocked, or generating alarms upon unauthorized entry, for example.

In public areas such as government buildings, airports, college campuses, and amusement parks, in examples, individuals must also often provide different types of credentials in order to pass through the access points of each public area. At airports, in one example, the public access point is a security checkpoint at a departure terminal of the airport. An individual provides physical documentation such as passports and printed boarding passes as their credentials. A security officer at the departure terminal then verifies the passport/boarding pass and authorizes the individuals to enter the departure terminal. At amusement parks, in another example, the public access point is typically an entrance booth at the amusement park and/or a gate at a ride within the amusement park. In examples, individuals typically purchase paper tickets or wristbands as their credentials at the entrance booth to the amusement park, and present the tickets/wristbands to a ride operator at a gate for each ride.

SUMMARY OF THE INVENTION

Traditional security systems using access control readers have limitations. The systems require the individuals to present access cards to the card reader at each access point to gain access to the restricted areas. Individuals typically must place their access cards such that the access cards either make direct physical contact with the access readers or are within a few inches of the access readers. This formal interaction process can be an inconvenience to the users of the system.

Traditional access control systems at public areas also have problems. At public access areas of an airport public area, in one example, individuals must typically provide their credentials using a piece of paper such as a passport and/or boarding pass. At public access points of an amusement park or ski resort, in other examples, individuals provide their credentials in yet a different format, using paper-based tickets or physical wristbands or RFID cards. The individuals present the tickets/wristbands at the public access point of each ride at the amusement park (e.g. a gate) to a ride or lift operator. These different interaction processes are very formal in nature and require different levels of interaction with persons and components, and as a result can also be an inconvenience to the users of the system. On the other hand, mobile computing devices are ubiquitous.

The present system is directed to a frictionless access control and tracking system. A frictionless system uses wireless technology that enables a more transparent method for identifying and tracking individuals while providing similar access control and tracking as traditional systems and methods. The present system can automatically identify and track individuals and enable access to areas or resources when authorized individuals are approaching or in threshold areas of the public access points. Threshold areas are typically areas within close proximity to the public access points, such as entrances of the restricted areas, such as an area near the access point, in one example or in areas where lines or queues form. Access points include interior or exterior doors of a building, or elevators, in examples. Frictionless systems accomplish these tasks without requiring the individuals to swipe or wave keycards, for example, at card readers, and can more continuously track those users in and around buildings.

In the present system, users carry active wireless devices on their person that transmits credentials which identify the users to a wireless receiving device, or positioning unit. Credentials are also known as user information. The active wireless user devices, or user devices, include electronic devices such as key fobs (or fobs) or mobile computing devices such as smart phones or tablet computing devices. These user devices broadcast the user information in data packets, also known as packet data. The packet data are received by positioning units.

On the other hand, because so many individuals carry these user devices on their person, the ability to track and authorize individuals provided by frictionless access control systems can also be applied to solve the problems associated with authorizing users at public access areas. Electronic versions of the credentials can be sent from user devices carried by the individuals to the public access points of each public area for verification and authorization. Examples of public access points include a security checkpoint at a departure terminal of an airport; a security checkpoint within or prior to an airplane at a passenger loading door of an airplane; a security checkpoint at an entrance to a building at a college campus or university; a security checkpoint at an entrance to an office, government building, or warehouse; and an entrance kiosk at an amusement park or at a ride within the amusement park or ski lift.

Nevertheless, these systems generally cannot address the problem of compromised user devices. If an authorized user has their phone stolen, for example, it can be used by individuals to pass through the access points.

The present invention addresses this problem of compromised user devices. It adds biometric recognition to confirm that the user device is being operated by its proper user.

The present system provides additional advantages over traditional systems and methods. In one example, the system can use the location information of the user devices determined by the positioning unit to aid in tracking or even evacuation of a premises.

For the purpose of aiding an evacuation of a premises, the system can initiate a "smart" lockdown in response to emergency situations (e.g., a fire, a prison riot, or a missing child/person in a store or building). In response to an emergency situation being initiated, an emergency lockdown signal is sent from a system controller to the verification and tracking system, which forwards the signal to the door controllers. This causes door controllers to unlock and grant or lock and deny access/movement through the access points according to the type of situation. If the specific location of the threat is known, the system can employ the user tracking information so that some access points may be strategically unlocked to enable users to evacuate to safety while confining the threat to a specific location.

During a lockdown, the access control system may implement "super user" fobs for specific personnel (e.g., security, law enforcement, first responders, firefighter, etc.) to enable only those people with the "super user" fobs to move through all areas of the building to neutralize the threat and/or treat and evacuate users.

The present system can also obtain additional information concerning the user such as biometric identifiers and video data, and use the additional information in conjunction with the rolling access codes to authenticate the user. Such a system is also known as a multifactored access control system. Biometric identifiers are the distinctive, measurable characteristics used to label and describe individuals. While the biometric identifiers and video data are different types of information about the user and require different technologies, they both challenge the user to enter additional information unique to the user and require additional verification, thereby enhancing security. As a result, a multifactored access control system provides yet another advantage over traditional systems and methods.

A rolling access code and/or multifactored access control system can be deployed in many different settings. Examples include universities, schools, hospitals, assisted living facilities, ports, and transportation hubs such as train stations and bus stations. In other examples, the rolling access code and/or multifactored access control system can be deployed in connection with vehicles such as cars, trains, buses, ships, and airplanes, in examples. When the rolling access code and/or multifactored access control system is installed in buildings, such a building can also be referred to as a "smart building." In a similar fashion, when the multifactored access control system is installed in vehicles, such a vehicle can also be referred to as a "smart transportation device."

For both smart buildings and smart transportation vehicles, biometric scanners such as fingerprint scanners can be installed at the same ingress/egress access points that also include the components that provide the rolling access code authentication of the user. In another example, video data of the user taken by a video camera at the ingress/egress points can be used in conjunction with the inventive rolling access code information to authenticate the user.

In general, according to one aspect, the invention features an access control system for monitoring a public access point. The access control system includes a positioning unit for tracking locations of users carrying user devices relative to the public access point based on wireless signals from the user devices, wherein the access control system determines whether the users are authorized to pass through the public access point based on the wireless signals from the user devices.

In examples, the public access point is a security checkpoint at an entrance to an office or government building or warehouse; a security checkpoint at an entrance to a building of a college or university; a security checkpoint at a departure terminal of an airport, a security checkpoint within or prior to an airplane at a passenger loading door of an airplane, and an entrance kiosk at an amusement park or at a ride within the amusement park.

In one embodiment, the access control system also includes a biometric reader that obtains biometric identification from the authorized users. In examples, the biometric identifiers of the users include fingerprint information and iris scanning information.

In one implementation, the access control system confirms identities of authorized users based upon the biometric identifiers of the users obtained from the authorized users when the authorized users are within a threshold area of the public access point. Preferably, the access control system confirms the identities of the authorized users based upon the biometric identifiers of the users by matching the biometric identifiers obtained from the users to a stored biometric identifier for each user. The access control system can then enable confirmed users to pass through the public access point.

In embodiments, the access control system also includes a system controller database which stores a user account for each of the users, and wherein each user account includes user information, video identification information, a biometric identifier, and authorization information that indicates if the user can pass through the public access point. Preferably, the positioning unit includes at least one antenna that determines the locations of the user devices from wireless signals sent by the user devices, wherein the user devices send user information for identifying the users in the wireless signals.

In general, according to another aspect, the invention features a method for controlling access of users to a public access point. The method comprises a positioning unit tracking locations of users carrying user devices relative to the public access point based on wireless signals from the user devices, and determining whether the users are authorized to pass through the public access point based on the wireless signals from the user devices.

In general, according to yet another aspect, the invention features an access control system for assisting in evacuation of a premises. The access control system includes a positioning unit for tracking locations of individuals carrying user devices relative to access points of the premises. The positioning unit tracks the locations of the individuals based on wireless signals from the user devices, and the access control system allows and/or denies the individuals to pass through the access points based on emergency information concerning the premises. In examples, the emergency information includes a type of emergency and one or more locations of the emergency within the premises.

In one implementation, the access control system allows and/or denies the individuals to pass through the access points based on emergency information concerning the premises. The access control system accomplishes this by referencing, within the emergency information, a type of emergency, and one or more locations of the emergency within the premises; comparing the locations of the individuals to the locations of the emergencies within the premises; and allowing and/or denying the individuals to pass through the access points based on the type of the emergency and the locations of the emergencies within the premises.

In general, according to still another aspect, the invention features a method for an access control system that assists in evacuation of a premises. The method comprises a positioning unit tracking locations of individuals carrying user devices relative to access points of the premises, wherein the positioning unit tracks the locations of the individuals based on wireless signals from the user devices; and the access control system allowing and/or denying the individuals to pass through the access points based on emergency information concerning the premises.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3C is a schematic diagram illustrating an embodiment of the positioning unit with a directional antenna such as a flat patch-array panel or horn antenna;

FIG. 6A is a schematic diagram of another embodiment of the access control system, where a public access point of the system is a security checkpoint at a departure terminal of an airport;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
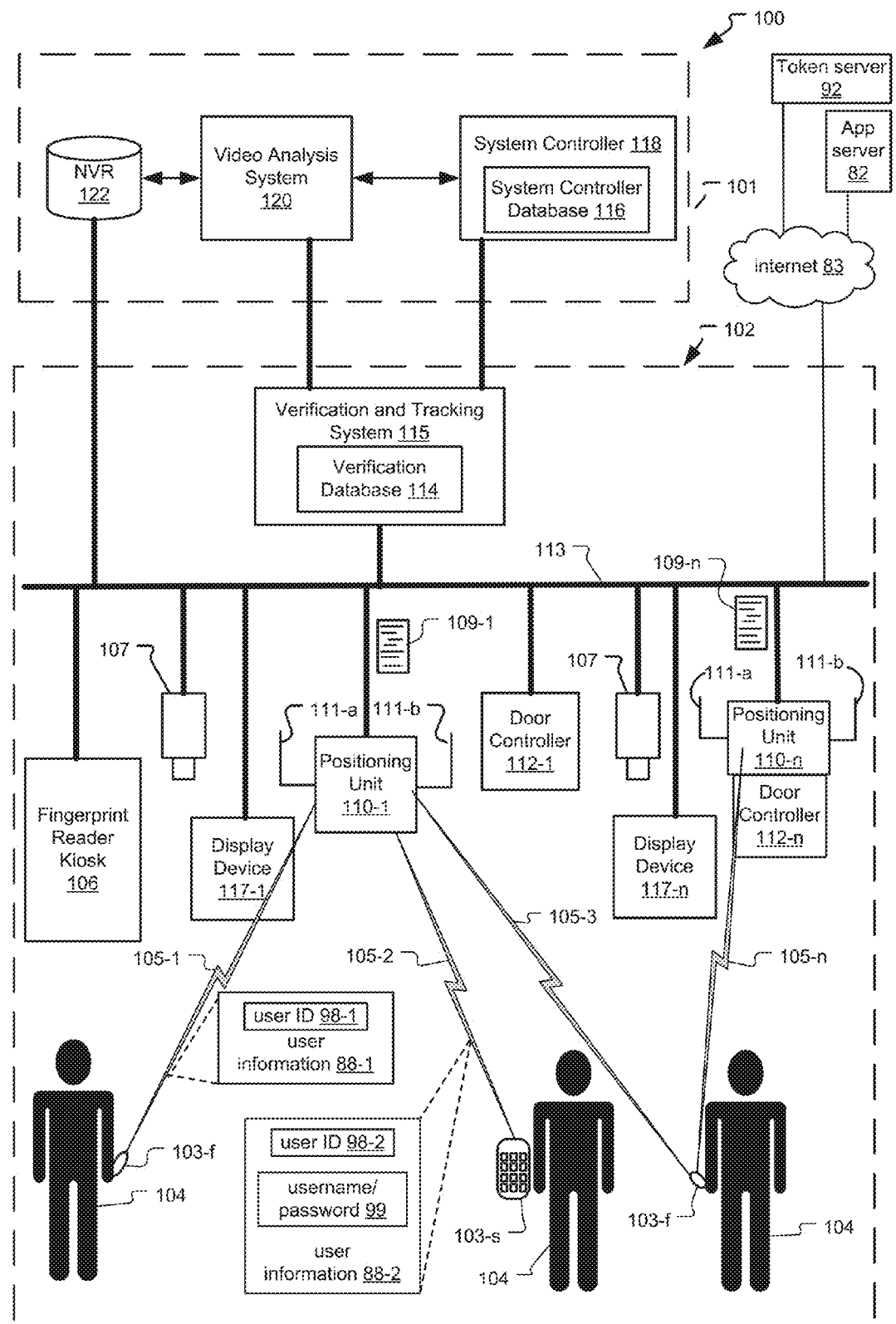
FIG. 1 is a schematic diagram of an access control system that identifies users, tracks locations of active wireless devices, and controls access to different and/or restricted areas.

FIG. 1 is a schematic diagram of an exemplary access control system 100 that identifies users 104, tracks locations of user devices 103 such as fobs 103-$f$ and smart phones 103-$s$ or other mobile computing devices, and enables access to restricted areas of a premises such as a building 102 or plane or access to a resource such as an amusement park ride or ski lift, to list a few cases. In the illustrated example, the access control system 100 is distributed between two or more locations or buildings 102. The system also includes backend components such as a system controller 118, a video analysis system 120, and a network video recorder 122 that are typically located in a security control room 101 or other secure location of the building or resort or campus 102. Alternatively, one or more of these components could be part of a remote service network such as a cloud-based network, or "cloud."

The system 100 also includes a verification and tracking system 115, and positioning units 110, and may further include additional components such as video cameras 107, a fingerprint reader kiosk 106, display devices 117, and door controllers 112. These devices are usually located within and/or adjacent to the building 102 that is being protected and/or secured by the system 100. These components communicate with one another over a data network 113. The positioning units 110 are located near access points of the building 102 or areas within the buildings such as door access points 129 that enable users 104 to physically enter or exit the building 102 or access different parts or access different resources or vehicles. On the other hand, the verification and tracking system 115 will typically control multiple positioning units 110. However, in some still other implementations, the verification and tracking system 115 could be integrated in the same box as the positioning unit 110.

In a typical implementation, users 104 carry user devices 103 (e.g., fobs, smartphones, tablets, phablets, or other mobile computing devices), which broadcast packet data 105-1 to 105-$n$. The packet data 105 includes user information 88 for identifying the users. The user information 88 can include a unique user ID 98 for each of the user devices 103 and other information for identifying the user such as a username/password 99, name of user, department, work extension, personal phone numbers, email addresses, and employee ID number, in examples. In one example, the user ID 98 includes a token or a hash of the token generated for the user 104, and it may or may not expire after a predetermined time.

In yet another example, a rolling security identification (id) or access code generated within the fob/user device 103 functions as the user ID 98. A rolling access code is a unique authentication code for each user 104. Each mobile phone user device 103 preferably transmits the access code at fixed periodic intervals.

The access code includes a random key or "seed" that is different for each fob/user device 103. The uniqueness of each key is accomplished by including the unique phone number of each mobile phone during calculation of the key, for example. In one implementation, the user ID 98 for user devices 103 is a token generated for each user. Typically, the token will include a TOTP (Time-based One Time Password) combined with the rolling security identification (id) code, or rolling code, maintained within the user device 103. A rolling code typically generates an authentication code associated with each user 104 at fixed intervals. The mobile phone 103 creates a security token from the key, and generates a 16-byte hash of the security token. The mobile phone 103 then includes the hash of the security token as payload within packet data 105 and broadcasts the packet data in wireless signals via Bluetooth.

Users carrying the user devices 103 enroll and/or register the user devices 103 with the system controller 118. When the user device is a fob 103-$f$, users access the system controller 118 to enroll the fob via a client application of the system controller 118. When the user device is a smart phone or other mobile computing device 103-$s$, the users 104 download a security app from the app server 82 to their user device 103-$s$, where the security app provides access to the system controller 118.

During the enrollment/registration process, the users 104 enter the user information 88 to create a user account 19 for each user on the system controller 118. For a fob user device 103-$f$, users provide the unique ID of the fob such as its Media Access Control (MAC) address as the user ID 98-1 of the user information 88-1. For a mobile phone (e.g. "smart phone") user device 103-$s$, users typically include the phone number of the user device 103-$s$ as the user ID 98-2 of the user information 88-2. Users can additionally include other user information 88 for identifying the users such as a username/password combination 99. In response, a user account 19 is created on the system controller 118 for the user with the specified user information 88. More detail concerning user accounts 19 follows the description of FIG. 2, included herein below.

An administrator will typically add authorization information 46 associated with each of the users 104 to the user account 19 based on security objectives. Authorization information 46 determines which users 104 are authorized to access specified restricted buildings or areas of a building 102. In one implementation, the authorization information 46 is provided as a separate access control list for each door controller 112, where the authorization information includes the user information 88 of users that are authorized to access each door controller 112. In another implementation, the authorization information 46 is a single access control list that identifies all door controllers 112-1 through 112-$n$ and the users that are authorized to access the door controllers 112-1 through 112-$n$.

When enrolling a smart phone user device 103-$s$ with a token as the user ID 98, the smart phone user devices 103 and the system controller 118 first access a token server 92 to request the token. In one implementation, the user, via the security app, includes the phone number of the user device in a request message to the token server 92. In response, the token server 92 generates a token, and sends the token to both the system controller 118 and the user device 103 in response. The token server 92 preferably sends the token to the user device in an SMS message. The token is then included as the user ID 98 within the user information 88 for the user, for both the user information 88 maintained for the user in the system controller 118 and the user information 88 included within the user device 103.

The wireless packet data broadcast from the user devices 103 is preferably secured to prevent unauthorized third parties from intercepting and viewing the packet data 105 during transmission (i.e. during broadcasts). In one example, the packet data 105 is encrypted. In a preferred embodiment, the user devices 103 broadcast the packet data 105 using BLE (Bluetooth low energy) technology.

Bluetooth is a wireless technology that operates in a 2.4 GHz (gigahertz) short-range radio frequency band. In free space, Bluetooth applications typically locate a Bluetooth device by calculating the distance of the user devices 103 from the signal receivers. The distance of the device from the receiver is closely related to the strength of the signal received from the device. A lower power version of standard Bluetooth called Bluetooth Low Energy (BLE), in contrast, consumes between ½ and ¹⁄₁₀₀ the power of classic Bluetooth. BLE is optimized for devices requiring maximum battery life, as compared to the emphasis upon higher data transfer rates associated with classic Bluetooth. BLE has a typical broadcast range of about 100-150 feet (approximately 35-46 meters).

When transmitting via BLE, the user devices 103 might send an AltBeacon compliant BLE broadcast message every second. If the user devices 103 utilize tokens as the user ID 98, the user devices 103 preferably include a hash representation of the token/user ID 98 in the BLE broadcast messages. In one implementation, the hash representation of the token is a 16-byte, one-way hash of the token computed using the phone number of the user device 103-$s$ as the seed key.

In an alternative implementation, the user devices 103 are capable of broadcasting via standard Bluetooth. In still other alternative implementations, the user devices 103 may broadcast via other wireless technologies such as Wi-Fi (IEEE 802.11), active RFID (radio frequency identification), or ZigBee, to list a few examples.

The positioning units 110 each preferably include two or more antennas 111. The packet data 105 are received by antennas 111-$a$, 111-$b$ of one or more positioning units 110-1 to 110-$n$, which are located throughout the building 102. The positioning units 110-1 to 110-$n$ determine locations of the users 104 using one or more positioning techniques.

A preferred positioning technique compares the relative signal strengths of the received wireless signals between two antennas 111 of the positioning unit 110. Another positioning technique includes determining time of flight or time of receipt of packet data 105 received at each of the antennas 111 of a positioning unit 110. In yet another positioning technique example, the positioning units 110 employ triangulation between two or more positioning units 110 installed within the building. The positioning units 110 then convert the locations of the users 104 into location data 109 for each of the users. This will typically require the positioning units to share a common reference clock.

The positioning units 110-1 to 110-$n$ receive the packet data 105 including the user information 88 for each user, and then send the user information 88 and the location data 109 to the verification and tracking system 115 via a data network 113. When the user devices 103 utilize tokens as the user ID 98, the positioning units 110 might extract the tokens from the hash representations of the tokens included in the packet data 105. The positioning units 110 use the phone number of the user devices 103 or other reference as the seed key for this purpose. The location data 109 are used by the verification and tracking system 115 to determine motion vectors for and to predict motion intent of the users 104, in examples.

Typically, the data network 113 is a Local Area Network (LAN) such as wired or wireless Ethernet. The positioning units 110-1 to 110-$n$ can also communicate with the verification and tracking system 115 via serial connections, in another example.

As the users 104 and their user devices 103 move through the building 102, resort, park, vehicle or airport, for example, the tracking of the user devices 103 and therefore of the users 104 is often "handed off" to other positioning units 110 in order to reduce or eliminate tracking blind spots within the building 102.

The verification and tracking system 115 accesses authorization information 46 in a verification database 114, which it maintains or which it simply accesses, to determine which users 104 are authorized to access specified restricted areas of a building 102 and/or pass through an access point. Once the users 104 are authenticated by the verification and tracking system 115, the verification and tracking system 115 sends a door control signal via the network 113 to the door controller 112-1, in one example. The door controller 112-1 then enables access to a restricted area by unlocking an access point of the restricted area, such as a door 129 or other portal, thereby providing access for the authorized user 104 to the restricted area while also possibly generating an alarm for an unauthorized user. The door controller 112-1 preferably unlocks the door 129 when the authorized user 104 is within a threshold area 131 near the access point (e.g., the door or other portal) of the restricted area.

The door controllers 112-$n$ can also be directly coupled to the positioning units 110-$n$. In this implementation, the verification and tracking system 115 sends door control signals via the network 113 to the positioning units 110-$n$, which in turn activate their door controllers 112-$n$ to enable access to the restricted areas.

In a typical implementation, the system 100 includes the system controller 118, which includes a system controller database 116. In general, the system controller 118 might store various user information 88 for each of the users 104 to the system controller database 116. The system controller database 116 also stores the authorization information 46 for the users 104 (e.g., which users 104 are permitted to access which restricted areas). Periodically, the system controller 118 sends updated user information 88 and authorization information 46 to the verification and tracking system 115 via the network 113. In response, the verification and tracking system 115 saves the received user information 88 and authorization information 46 to its verification database 114.

The verification and tracking system 115 accesses the user information 88 and authorization information 46 within its verification database 114, which acts as a local copy or "cache" of the information. To manage the temporal relevance of the entries in its verification database 114, the verification and tracking system 115 maintains a current time, and applies a time stamp to each item of user information 88 and authorization information 46 received from the system controller 118.

In the exemplary system 100, the video cameras 107 record video data, which are sent via the network 113 to the network video recorder 122 to store the video data. Typically, time and date information are added to video data to enable the data to be indexed and reviewed at a later date. This information is also known as video metadata. The video analysis system 120 analyzes video data and may associate metadata to moving objects (e.g., people), numbers of moving objects, and specific users, to list a few examples.

The verification and tracking system 115 then sends the location data 109 in conjunction with the video data from the video cameras 107 to the video analysis system 120 for analysis. The video analysis system 120 typically analyzes the location data 109 with the video data from the video cameras 107 to verify that the user is a proper user. In one example, facial recognition information that the video analysis system 120 determines from the video data is used to confirm that the individuals possessing the user devices 103 are the proper users 104. This safeguards against an event such as when a user device 103 for a valid employee user 104 of a business is stolen or lost, and a different individual (e.g. other valid user 104, former employee of the business, or criminal) attempts to gain access to a restricted area of the building via the same user device 103. In other examples, the video analysis system 120 analyzes the tracking information provided by the location data 109 in conjunction with the video data to determine which individuals in a scene are users (holding users devices 103) and which are non-users (not holding user devices 103).

Typical embodiments of the system 100 include display devices 117-1 to 117-n. These display devices 117-1 to 117-n could be screens of access control readers or standalone display devices (e.g., LCD screen), for example. In one embodiment, the display devices 117-1 to 117-n are wirelessly connected to the network 113. In an alternative embodiment, the display devices 117-1 to 117-n are connected via wired connections and receive power via PoE (power over Ethernet).

The display devices 117-1 to 117-n, if used, display messages to the users 104 such as "access granted", "access denied", warnings about low power conditions of the user devices 103 or warnings about emergency situations, in examples. Additionally, personalized messages may be directed towards specific users regarding personal and/or work matters. For example, a message could be generated by a supervisor attempting to locate an employee user. In another example, a message could be generated indicating that a family member and/or relative of the user are attempting to contact the user 104. These messages can be efficiently targeted at the intended recipient since the user location information 109 is known and thus it is known when they are in front of a display device 117, for example.

Typically, low power conditions of the user devices 103 are identified by the positioning units in response to the positioning units determining a signal strength of the wireless signals sent from the user devices 103, and comparing the determined signal strength to a range of expected/threshold signal strength values maintained by the positioning units 110. The range of expected signal values additionally take into account the distance between the user device and the positioning units 110.

A fingerprint reader kiosk 106 may also be deployed in some embodiments of the system 100. In some high-security situations, users are required to periodically return to the fingerprint reader kiosk 106 and scan their fingerprint(s) to re-authenticate with the system 100. This process helps ensure that the user in possession of the fob or other user device 103 is also the registered owner of the user device 103.

While not shown in the illustrated figures, fingerprint scanners may be implemented in the fobs or mobile computing devices 103, in still other examples. In this scenario, the users 104 would not have to periodically return to the fingerprint reader kiosk 106. Rather, the users would periodically authenticate themselves via the fingerprint reader integrated within the user devices 103.

Figure 2:
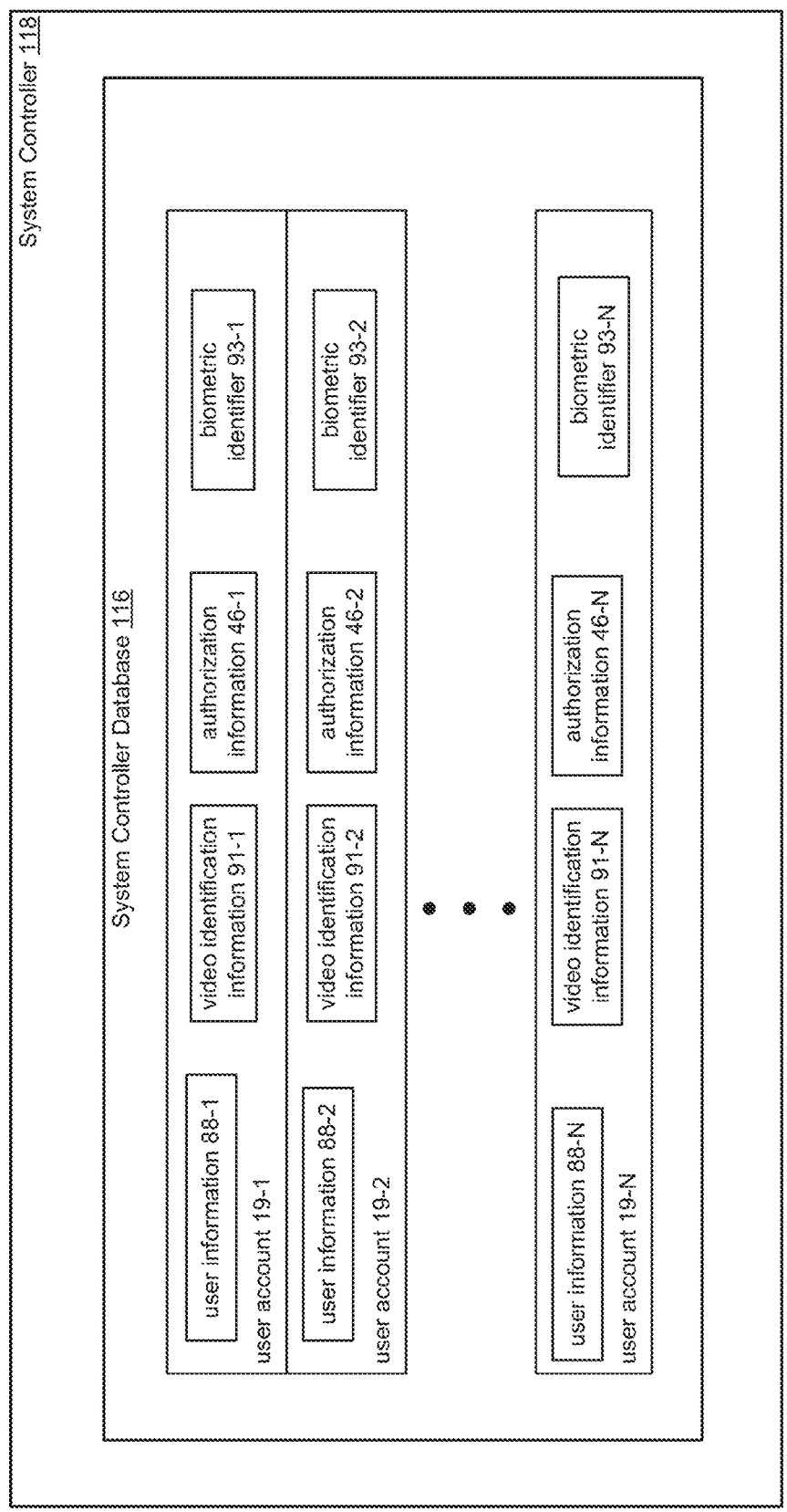
FIG. 2 is a block diagram illustrating detail for exemplary user accounts stored for each user within a system controller of the access control system, where each user account includes different types of information for identifying the users and confirming the identity of the users.

FIG. 2 shows exemplary user account records, or user accounts 19, stored for each of the users within the system controller database 116. Each user account 19 includes information such as user information 88, authorization information 46, video identification information 91, and biometric identifiers 93 for each of the users. Exemplary user accounts 19-1, 19-2, and 19-N are shown. The access control system 100 references the set of user accounts 19 to authorize users 104 at the access points 129, and to confirm the identity of the authorized users at the access points 129, in examples.

A system administrator creates an initial user account 19 for each user of the access control system 100. The system administrator and/or the user create user information 88 for each user such as a unique ID 98, and username/password combination 99. The system administrator, based on security policies, creates authorization information 46 for each user that indicates which access points 129 each user is authorized to pass through.

In another example, video identification information 91 can be stored for each user. Video identification information 91 includes physical characteristics of the users that are obtained from analyzing video data of the users. Examples of video identification information 91 include facial image information and gait information, clothing worn, and tattoos, in examples. In yet another example, biometric identifiers 93 can be created for each user 104, where biometric identifiers include fingerprints and iris scans of the user, in examples.

It is also important to note that the user accounts 19 can be stored elsewhere within the access control system 100. In one implementation, the system controller 118 can periodically send the user accounts 19 to the verification and tracking system 115 for storing the user accounts 19 to the verification database 114. In this way, the user accounts 19 within the verification and tracking system 115 act as a "local cache" of user accounts 19. Moreover, the verification and tracking system 115 can then send the user accounts 19 to the positioning unit 110 for storage to a local cache of user accounts 19 within the positioning unit 110.

Figure 3A:
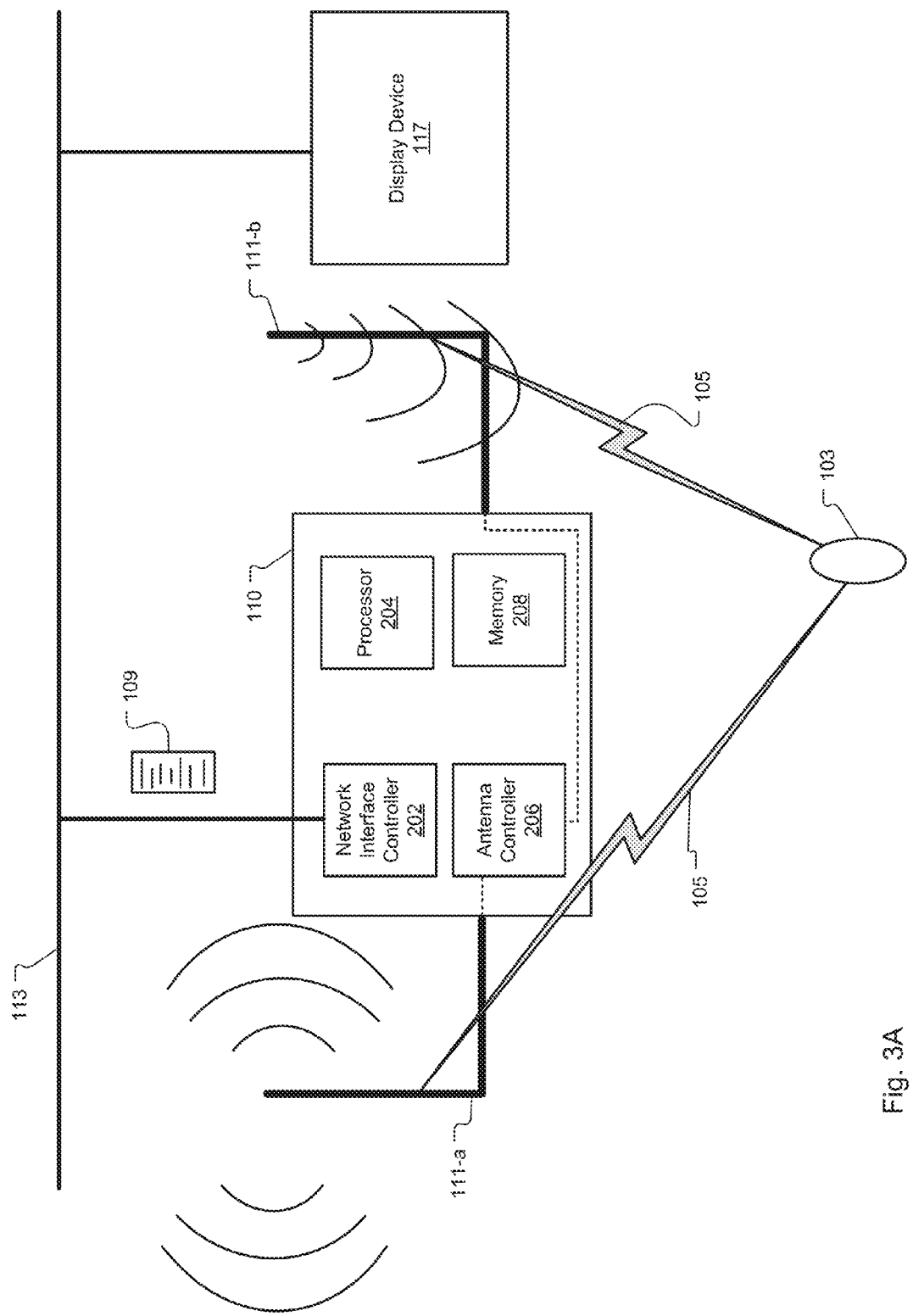
FIG. 3A is a schematic diagram illustrating a preferred embodiment of a positioning unit at an access point of a premises, where the positioning unit includes one omnidirectional antenna and one directional antenna for determining a location of an active wireless device such as a fob or mobile computing device.

FIG. 3A is a schematic diagram illustrating a preferred embodiment of the positioning unit 110, which includes at least two antennas 111-a, 111-b (e.g., one omnidirectional antenna and one directional antenna) for determining a location of a fob or other user device 103-f or mobile computing device (e.g., a smartphone 103-s). Preferably, Bluetooth or Bluetooth Low Energy (BLE) is the wireless technology used for communications between the user devices 103 and the positioning units 110.

In a BLE-enabled system, users carry an active BLE device on their person that transmits their user information 88 including user IDs 98 to one or more BLE-enabled positioning units 110 located in different places throughout a building 102. However, the characteristics of Bluetooth signals can present challenges when determining the location of an individual relative to access points of a building 102. This especially impacts BLE because of its lower power and therefore more limited distance range as compared to standard Bluetooth signals.

When BLE receivers such as positioning units 110 are installed in buildings 102, objects and obstructions such as walls and furniture located in the vicinity of the access points can adversely affect or enhance the reception of Bluetooth signals. This is because the objects absorb, reflect and refract radio waves in different ways and in different amounts. As a result, Bluetooth signals can scatter to the point of becoming directionless. This can severely limit the distance-signal strength relationship between the user devices 103 and the positioning units 110 and therefore the ability of the positioning units 110 to locate and track the user devices 103.

To solve this problem, the positioning system 110 includes two antennas 111-a and 111-b for determining the location of a fob 103-f or mobile computing device (e.g., a smartphone 103-s) as the user devices 103. In one example, the first antenna 111-a and the second antenna 111-b are both BLE antennas. In the preferred embodiment, the first antenna 111-a is an omnidirectional antenna and the second antenna 111-b is a directional antenna. More generally, the second antenna 111-b only needs to be more directional than the first antenna 111-a. The antennas 111 detect packet data 105 broadcast by user devices 103, which are carried by the users 104 or are located on their person.

Typically, the directional BLE antenna 111-b establishes the close proximity of a user 104 to an access point such as a door 129, and the omnidirectional BLE antenna 111-a allows the system 100 to continuously monitor (e.g. track) the locations of the users 104. In one implementation, the directional antenna can receive BLE broadcasts from user devices 103 located typically within a 3 foot by 3 foot region or threshold area 131 in front of a door access point 129. The door access point 129, in turn, enables access to a restricted area of a building 102. In contrast, the omnidirectional antenna 111-b can receive BLE broadcasts sent from user devices 103 in all locations/directions. Typically, the omnidirectional antenna 111-b can receive BLE broadcasts sent from user devices 103 located beyond the threshold area 131 but that are also still within the signal range of the omnidirectional antenna 111-b.

Using positioning techniques (e.g., time of flight to each antenna, triangulation with other positioning units, and/or signal strength calculations), the positioning unit 110 is able to determine the location of the user devices 103. Additionally, the use of an omnidirectional antenna 111-a and a directional antenna 111-b enable finer granularity in the location calculations since the directional antenna 111-b can be used to generate finer location information within a specific region such as a door threshold.

In the illustrated example, the positioning unit 110 includes a network interface controller 202, a processor 204, an antenna controller 206, and memory 208. The network interface controller 202 provides an interface with the network 113. This enables the positioning unit 110 to communicate with the verification and tracking system 115 and the door controllers 112-1 to 112-n.

Figure 3B:
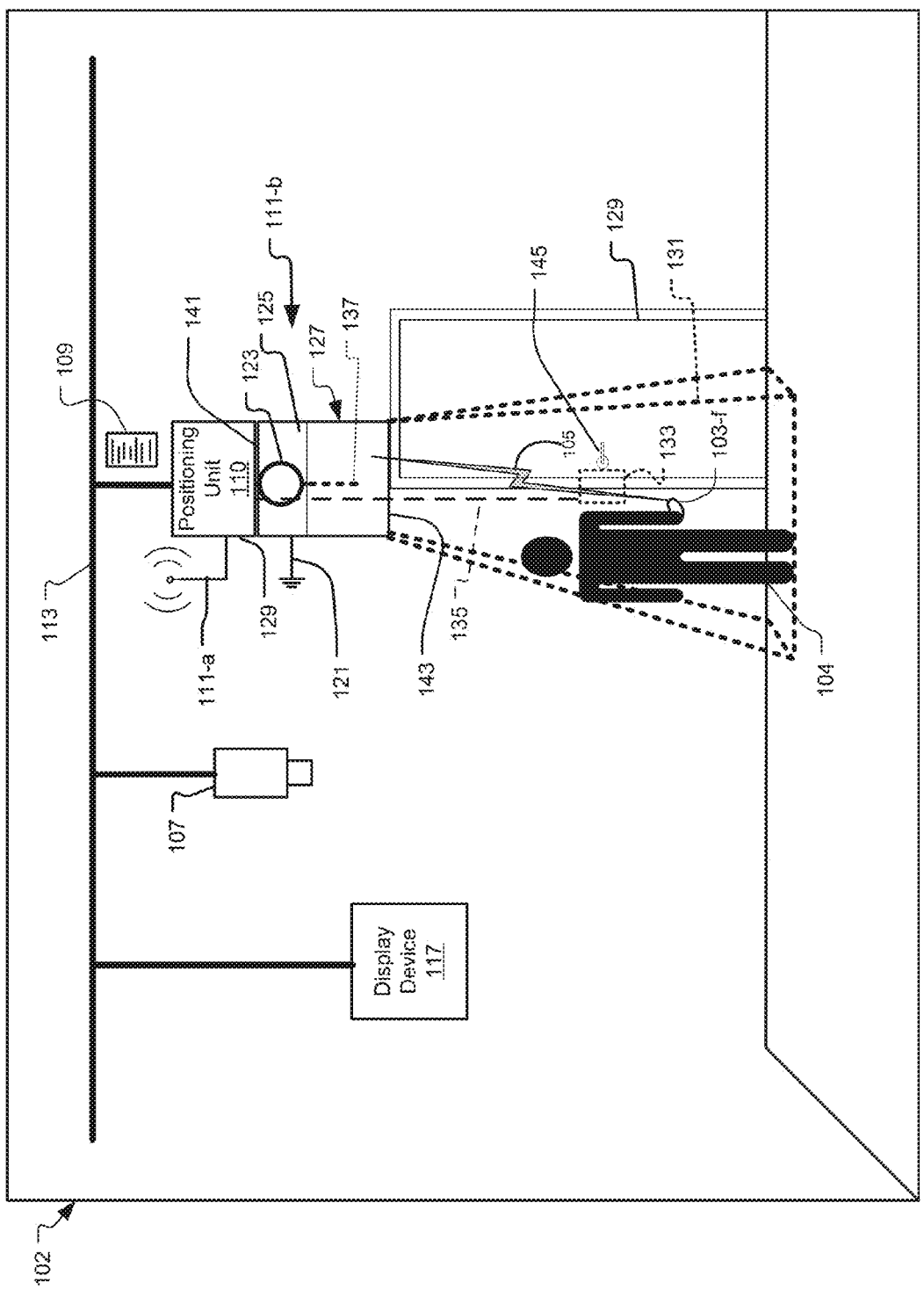
FIG. 3B is a schematic diagram illustrating an alternative embodiment of the positioning unit.

FIG. 3B is a schematic diagram illustrating another embodiment of the positioning unit 110 that also includes an omnidirectional antenna 111-a and a directional antenna 111-b. The directional antenna 111-b comprises an omnidirectional antenna 137 that is housed within an enclosure 127, e.g., antenna horn, to form the directional antenna 111-b. The directional antenna 111-b is preferably oriented towards a door striker 133 of a door 129 access point. The door striker 133 is typically integrated with or located adjacent to a door handle 145 of the door 129.

In the illustrated example, the positioning unit 110 includes the omnidirectional antenna 111-a mounted to the exterior surface 142 of a housing of the positioning unit 110 to continuously monitor the locations of users 104. Additionally, a door striker 133 is electrically coupled to the positioning unit 110 via a connection (e.g., universal serial bus) 135, which is typically installed within the walls of the building 102.

The directional antenna 111-b is created, in one implementation, by housing the omnidirectional antenna 137 within a grounded (e.g., ref. numeral 121) partial Faraday enclosure (enclosure) 127 of the positioning unit 110 to create directionality. In one example, the enclosure 127 is fabricated from aluminum, but other conductive materials known in the art could also be used. In a typical implementation, the enclosure 127 includes copper shielding (e.g., copper mesh) 125. Preferably, the shielding and enclosure are designed to shield the omnidirectional antenna 137 from 2.4 GHz signals arriving from the front, back, top, and sides of the enclosure 127. In another implementation, the directional antenna is a patch array antenna, where the patches in the array are built using microstrip technology.

A bottom 143 of the enclosure 127 is left open to create an aperture and allows the entrance of wireless signals such as 2.4 GHz Bluetooth signals. The waves travel upward from the bottom 143 of the enclosure 127 towards the second omnidirectional antenna 137, which is preferably mounted at a top 141 of the enclosure 127. Typically, the length of the enclosure 127 is adjustable based on the required/desired angle of incidence for the threshold area 131 near the locked door 129.

More generally, the enclosure 127 comprises a flaring, preferably, metal waveguide that has a typically rectangular, square or circular aperture and a generally pyramidal or conical shape with the omnidirectional antenna 137 located at or near the vertex. The aperture is preferably oriented towards a door striker 133 of a door 129 access point. In some embodiments, two omnidirectional antennas 137 are located at the vertex at right angles to each other to avoid polarization sensitivity.

In a current embodiment, the enclosure 127 is approximately 5 inches wide and 7 inches long (13 centimeters by 18 centimeters) or less and 2 inches (5 centimeters) in depth, or less. Preferably, these dimensions create an adaptive waveguide for 2.4 GHz Bluetooth signals. In alternative embodiments, the dimensions (e.g., length, width, depth) of the enclosure 127 and the shape of the aperture (e.g., opening) of the enclosure 127 may be altered depending on the required/desired angle of incidence for the threshold area 131. Additionally, the dimensions may also be adjusted depending on a desired operating frequency of the wireless technology of the second antenna 111-b.

In yet another alternative embodiment, the enclosure 127 is fabricated with extendable and/or collapsible walls and/or hinged sections (not shown) to allow the aperture to be adjusted, typically at the time of installation.

Generally, the aperture of the enclosure 127 is designed to allow the passing of a 2.4 GHz wave upward from the bottom of the enclosure 127 to the omnidirectional antenna 137 and then to a receiver (e.g., Bluetooth receiver), which is installed within the enclosure 127 and mounted to the top wall of the enclosure 127 or adjacent to the enclosure. Typically, the Faraday enclosure 127 does not completely block radio waves from the sides and top of the enclosure. The waves from the sides and top of the enclosure 127 are only partially attenuated. In one embodiment, the enclosure 127 and omnidirectional antenna 137 are attached to a gimbal 123, which allows for precise adjustment of the directionality of the antenna such that its aperture is directed at the threshold area 131.

In a typical implementation, the threshold area 131 is defined by the projected aperture of the directional antenna 111-b and is approximately 3 feet (or approximately 1 meter) deep (e.g., distance out from the door) and includes a width of that typically ranges between 3-6 feet (e.g., 1-2 meters). Additionally, the threshold area 131 is generally installed off-center from the door 129 to account for an opening and closing are of the door 129, often being centered on the door handle 145.

In other examples, where the access point is a hallway, the projected aperture and thus the threshold area 131 extends laterally across the hallway so that users must pass through the threshold area to transit the access point.

In a preferred embodiment, the positioning unit 110 accounts for signals that are reflected off of surfaces and objects (e.g., walls, furniture, people) as well as signals from devices on different floors and/or behind the door 129, which leads to the restricted area. The positioning unit 110 must account for signals coming from other areas of the building 102 because the signals in the 2.4 GHz band are able to travel through walls and floors. Moreover, the positioning unit 110 must also ensure that the door striker 133 is not accidentally unlocked due to an authorized user 104 walking on a different floor.

FIG. 3C is a schematic diagram illustrating another embodiment of the positioning unit 110. Instead of using an omnidirectional antenna within an enclosure to form the directional antenna 111-b, however, native directional antenna technology is used.

In one example, the directional antenna 111-b is a horn antenna. Generally, horn antennas include a waveguide to collect radio waves from a given direction, characterized by horizontal and vertical beam widths, for reception and detection.

In another example, the directional antenna 111-b is a flat panel antenna, fixed phased-array antenna, or a phased-array or patch-array antenna. These are directional antennas that can be flush mounted in the wall or ceiling.

Figure 4:
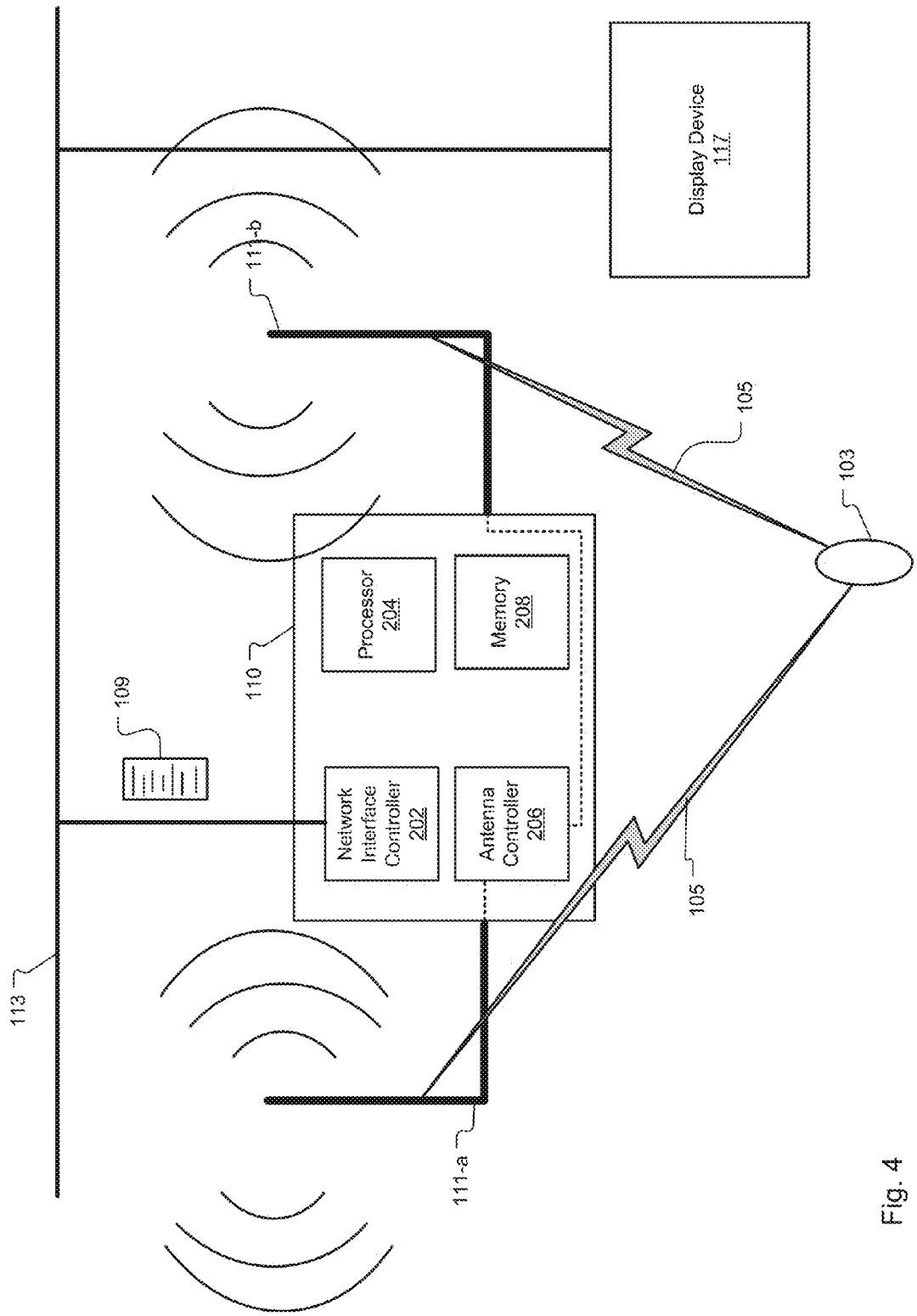
FIG. 4 is a schematic diagram illustrating an alternative embodiment of the positioning unit, which includes two omnidirectional antennas.

FIG. 4 is schematic diagram illustrating an alternative embodiment of the positioning unit 110. In this embodiment, the positioning unit 110 includes two omnidirectional antennas. This embodiment uses triangulation based on the time of receipt of signals from the user device 103 to determine the range and direction of the user device 103 from the positioning unit and whether the user devices and users are located within the threshold area 131.

Figure 5:
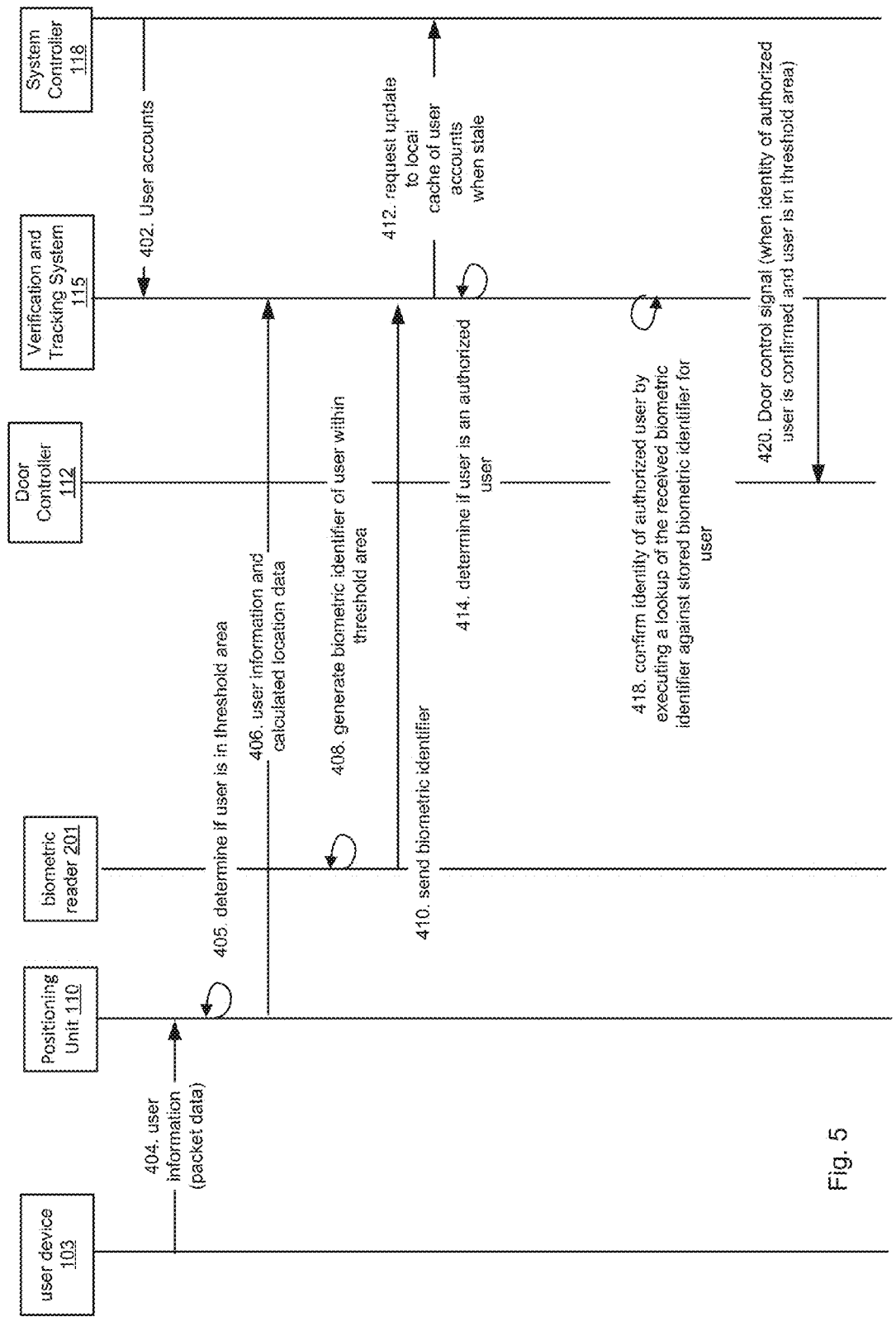
FIG. 5 is a sequence diagram for an exemplary implementation of the access control system for providing users with access to a restricted area, where the sequence diagram illustrates the interactions between a mobile active wireless user device (e.g., mobile computing device, e.g., a smartphone, or fob), the positioning unit, a door controller, a verification and tracking system, one or more video cameras, a biometric reader, and a system controller.

FIG. 5 shows component interactions for an exemplary implementation of the system 100. In this implementation, the verification and tracking system 115 sends a door signal to the door controller 112 to unlock the door access point 129 in response to the verification and tracking system 115 authorizing the user 104 after the user has entered the threshold area 131, and then confirming the identity of the authorized user based upon biometric identifiers 93 of the users. In addition, this implementation of the access control system 100 utilizes a local cache of the user accounts 19 within the verification and tracking system 115.

First, in step 402, user accounts 19 including user information 88, video identification information 91, biometric identifiers 93, and authorization information 46 are sent from the system controller 118 to the verification and tracking system 115 via the network 113. This updates a local "cache" of user accounts 19 including user information 88 and authorization information 46 within the verification database 114 of the verification and tracking system 115. The system controller 118 periodically updates the verification and tracking system 115 at regular intervals (e.g., daily, weekly). Locally storing the user accounts 19 to the verification and tracking system 115 enables faster operation and allows the system 100 to continue to function if communications are lost with the system controller 118.

In step 404 and generally on a continuous/periodic basis, the user device 103 broadcasts wireless signals including user information 88, and the positioning unit 110 detects the wireless signals and extracts the user information 88. Additionally, the positioning unit 110 calculates the location of the user device 103, and determines if the user device (and therefore if the user) is in the threshold area 131, in step 405. The user information 88 and the location data 109 are then sent to the verification and tracking system 115 for authorization in step 406. In examples, the user device 103 can have integrated BLE capability, or include an external BLE-enabled device such as a BLE dongle that plugs into a USB port of a smartphone user device 103-s, in examples.

In step 408, a biometric reader 201 generates biometric identifiers 93 of the users within the threshold area 131. In examples, the biometric reader 201 is a facial recognition scanner or an iris scanner. The biometric reader 201 is positioned to capture the relevant features of the user (e.g. face or iris of the user 104) as the user stands within the threshold area 131 in front of the access point 129. According to step 410, the biometric reader 201 sends the biometric identifiers 93 to the verification and tracking system 115.

According to step 412, the verification and tracking system 115 can request an update to its local cache of user accounts 19 when stale. The information 88/46/91/93 within the user accounts 19 is stale if its time stamp indicates that it is older than a predetermined threshold value (e.g. one hour) as compared to the current time, in one example.

In step 414, the verification and tracking system 115 then determines if the user 104 is as authorized user for the access point 129. For this purpose, the verification and tracking system 115 first compares the user information 88 forwarded from the positioning unit 110 to the stored user information 88 within its local cache of user accounts 19. If required, the verification and tracking system 115 may confirm user status and account information with the system controller 118 if the users' information 88 have not been previously sent to the verification and tracking system 115.

Upon finding a match, the verification and tracking system 115 then executes a lookup of the matched user information 88 against the locally stored authorization information 46 in the cache for the user. If the authorization information 46 indicates that the user is allowed access to the access point 129 near the positioning unit 110, the verification and tracking system 115 identifies the user 104 as an authorized user for the access point 129. In one implementation, this occurs when the matched user information 88 is referenced within the authorization information 46.

Then, in step 418, the verification and tracking system 115 confirms the identity of each authorized user. For this purpose, the verification and tracking system 115 executes a lookup of the biometric identifiers 93 received from the biometric reader 201 against the stored biometric identifiers 93 in the cache for the user.

In step 420, if the identity of the authorized user has been confirmed and the user's user device 103 was also determined to be within a threshold area 131, then the verification and tracking system 115 sends a door control signal to the door controller 112 to enable the user to pass through the access point associated with a restricted area 153 (e.g., unlock the door 129 access point), in one example. In the event that there are multiple authorized users also within close proximity of the access point 129, then the door controller 112 keeps the access point 129 unlocked until all users have entered the restricted area 153.

Additionally, while not illustrated in the figure, the verification and tracking system 115 may also send "Access granted" messages to be displayed on display devices 117 to provide visual indications to the users, in some examples.

FIG. 6A is a schematic diagram of another use of an access control system 100. In this embodiment, the system 100 is deployed within an airport public area. Because the access points of public areas are public in nature, these public access points are indicated by reference 129'. The public access point 129' in FIG. 6A is a security checkpoint for airport departure terminals. In the example, the system 100 controls access through the public access points 129' of the airport departure terminals.

In this example use, security personnel such as a security guard 124 are stationed at desks 194 and other locations near the public access points 129'. In one example, the security guard 104-s (e.g., Transportation Security Administration (TSA) personnel) configure and monitor the system 100 and its components via a management system 152. Pointing device 195 such as a mouse or touchscreen connected to the management system 152 allows the security guard 104-s to interact with the system 100. Information concerning the system is displayed on local display device 117-1 and on larger display device 117-2, in one example. One or more video cameras 107 capture video data of the individuals as the individuals approach or enter a threshold area 131 of the public access points 129'.

Users 104 carrying user devices such as mobile phones 103 attempt to transit the public access points 129'. Unlike traditional security checkpoints at airports, where users present various forms of paper documentation such as passports and driver licenses as credentials/user information 88, the credentials of the users are sent electronically as user information 88 within packet data 105. The packet data 105 is included within wireless messages 105 sent from the user devices 103. The positioning unit 110 receives the wireless signals preferably when the user is standing within the threshold area 131 of the public access point 129'.

As described in FIG. 1, the verification and tracking system 115 in FIG. 6 authorizes the user to pass through the public access point 129'. The verification and tracking system 115 might signal the door or gate controller 112 to unlock the public access point 129' for authorized users. Also unlike traditional security checkpoints at airports, the public access point 129' does not require manual interaction with a security guard 124 or other personnel to authorize the users to pass through the public access point 129'.

Figure 6B:
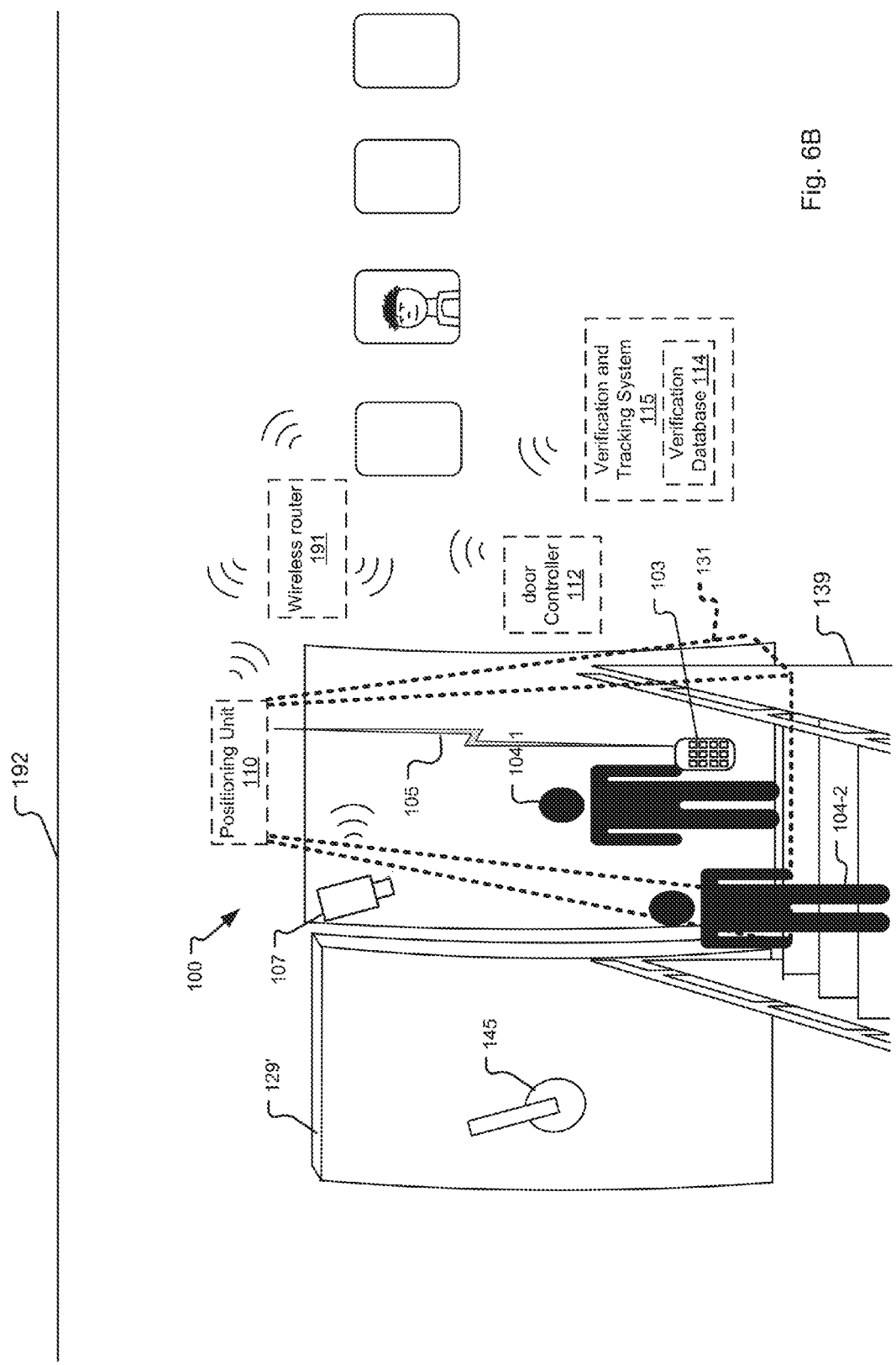
FIG. 6B is a schematic diagram of yet another embodiment of the access control system, where the public access point of the system is a security checkpoint within or prior to an airplane at a passenger loading door of an airplane.

FIG. 6B is a schematic diagram of yet another embodiment of an access control system 100. In this embodiment, the system 100 controls access to an airplane 192. Public access points 129' can be within the airplane 192, at its passenger loading bridge/gangway or at an entrance to the gate, where boarding passes are checked, in examples.

A wireless router 191 provides a wireless data network 113. Devices that communicate over the wireless data network 113 include the positioning unit 110, door controller 112, and verification and tracking system 115, and security camera 107, in examples.

In the example, users 104 carrying user devices such as mobile phones 103 attempt to access to the public access point 129'. In one example, a ramp 139 on the tarmac upon which the airplane 192 resides allows the users 104 to come within the vicinity of the public access point 129'. In another example, the access control system 100 is deployed within a passenger loading bridge/gangway that takes the users 104 directly from an airport terminal to the public access point 129'.

As in FIG. 6A, the user devices 103 carried by the users 104 in FIG. 6B send the user information 88 of the users in wireless messages. The positioning unit 110 extracts the user information 88 from the wireless signals, and the verification and tracking system 115 identifies and authorizes the users from the user information 88 and signals the door or gate controller 112 to unlock or otherwise provide transit through the public access point 129' for authorized users.

Figure 6C:
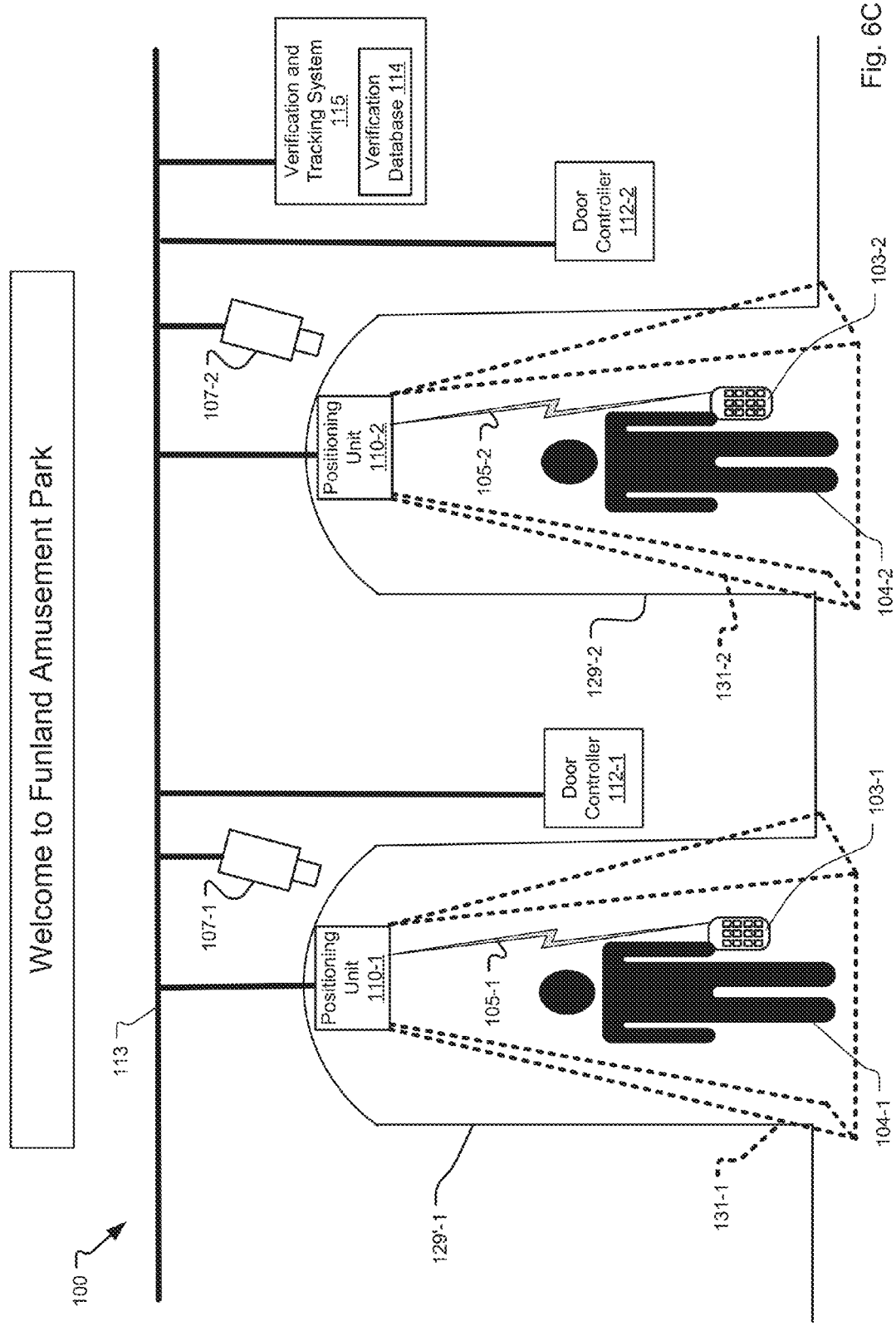
FIG. 6C is a schematic diagram of still another embodiment of the access control system, where the public access point of the system is an entrance kiosk at an amusement park or at a ride within the amusement park or at a ski resort.

FIG. 6C is a schematic diagram of still another embodiment of an access control system 100. In this embodiment, the system 100 controls access in or to an amusement park or ski resort. Public access points 129' can be entrance booths or kiosks to the amusement park or resort itself, or smaller versions of entrance kiosks that enable access to individual rides within the amusement park or resort. Entrance kiosks 129'-1 and 129'-2 are shown. Note that the system 100 can also provide access to other types of facilities such as conference centers, museums, in examples of still other uses. Video cameras 107-1 and 107-2 can also be installed near access points 129'-1 and 129'-2.

Unlike traditional public access points 129' of amusement parks or resorts, where users present various forms of paper documentation such as tickets, wristbands, or one-time-use access control cards or RFID cards as credentials/user information 88, the credentials of the users are sent electronically as user information 88 within packet data 105-1/105-2. The packet data 105-1/105-2 is included within wireless messages sent from the user devices 103-1/103-2. The positioning units 110-1/110-2 receive the wireless signals preferably when the users 104-1/104-2 are standing within the threshold area 131-1/131-2 of the public access points 129'-1/129'-2.

Users 104-1 and 104-2 carry or present user devices 103 such as mobile phones 103-1 and 103-2 at public access points 129'-1 and 129'-2, respectively. Additionally, the user devices 103 can also be reprogrammable fobs 103-f worn as wristbands by the users. Public access point 129'-1 includes positioning unit 110-1 and door or gate controller 112-1, and public access point 129'-2 includes positioning unit 110-2 and door controller 112-2. To gain access through the public access point 129'-1 and 129'-2, user device 103-1 of user 104-1 sends wireless messages including packet data 105-1 and user device 103-2 of user 104-2 sends wireless messages including packet data 105-2. Positioning units 110-1 and 110-2 preferably receive the wireless messages when the users are within the threshold areas 131-1 and 131-2 of public access point 129'-1 and 129'-2, respectively. User information 88 of each user 104 is included within the packet data 105-1/105-2.

As in FIGS. 6A and 6B, the user devices 103 carried by the users 104 in FIG. 6C send the user information 88 of the users 104-1/104-2 in wireless messages, the positioning unit 110 extracts the user information 88 from the wireless signals, and the verification and tracking system 115 signals the door controller 112 to unlock the public access point 129' for authorized users. Also, unlike traditional public access points 129' of amusement parks, after the user 104 has paid their entrance fee and fees associated with each ride, the users can then present their user devices 103 at the public access points 129' of each ride. If the users 104 are authorized at the public access points 129' of a ride, no further interaction with ride personnel is required, and the authorized users can pass through the public access points 129' of each ride to which the users are authorized.

Figure 6D:
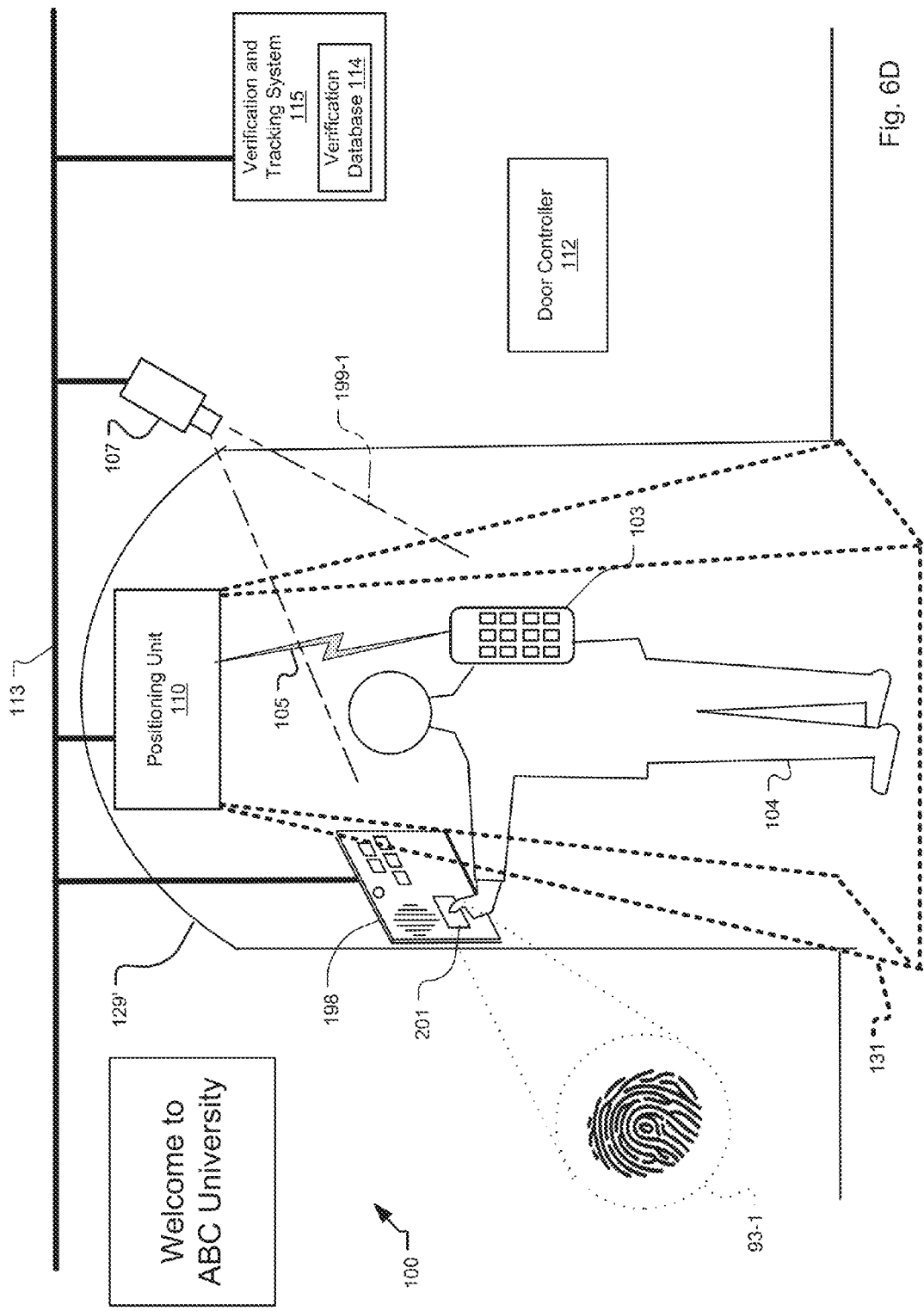
FIG. 6D is a schematic diagram of still another embodiment of the access control system, a multifactored access control system, and where the access control system authorizes the users and then confirms the identity of the authorized users based upon biometric verification of the users, and where the public access point of the system is a security checkpoint at an entrance to a building of a college or university, for example.

FIG. 6D is a schematic diagram of another embodiment of an access control system 100, a multifactored access control system. In this embodiment, the system 100 controls access to public access points 129' of a college campus or university. Public access points 129' can be security checkpoints at entrances to buildings within the university. Examples of public access points 129' in this embodiment include foyers at student dormitory buildings, faculty-only rooms within buildings. Unlike the embodiments presented thus far, this embodiment obtains different pieces of information concerning the user 104 in different phases or steps. The system 100 then uses the different pieces of information concerning the user to authorize the users, confirm the identities of authorized users, and enable the confirmed users to pass through the public access points 129'.

The system 100 includes a control panel 198 that includes an integrated biometric reader 201 (e.g. a fingerprint scanner). The fingerprint scanner 201 produces a fingerprint biometric identifier 93 of the user 104. The system 100 uses the fingerprint biometric identifier 93-1 in conjunction with the user information 88 included in the wireless messages sent from the user devices 103. The system authorizes the users from the user information 88, and confirms that the authorized users are proper users via the biometric identifiers 93 of the users. In another example, the biometric reader 201 is a vascular or other pattern scanner that uses near infrared light to detect patterns of a user's blood vessels in their hands and/or fingers and/or iris and/or retina to identify the users 104.

In another example, video camera 107 captures video data concerning the user within the field of view 199-1 of the video camera 107. The video data is sent via the verification and tracking system 115 to the video analysis system 120 to identify the user 104 within the video data. In examples, identification of the user 104 within the video data includes facial recognition and human behavioral analysis recognition (e.g. identifying a user by their distinctive gait and/or body proportions). In response to confirming the authorized users 104 via the biometric identifiers 93, the verification and tracking system 115 signals a door controller to unlock or otherwise allow passage through the public access points 129' for authorized users.

A premises that includes such a multiphase access control system 100 can also be thought of as a "smart building." Examples of smart buildings can include warehouses, government buildings, or any building or facility 102 where authorizing multiple pieces of information concerning the users is required as a condition for granting access to the building 102.

Figure 6E:
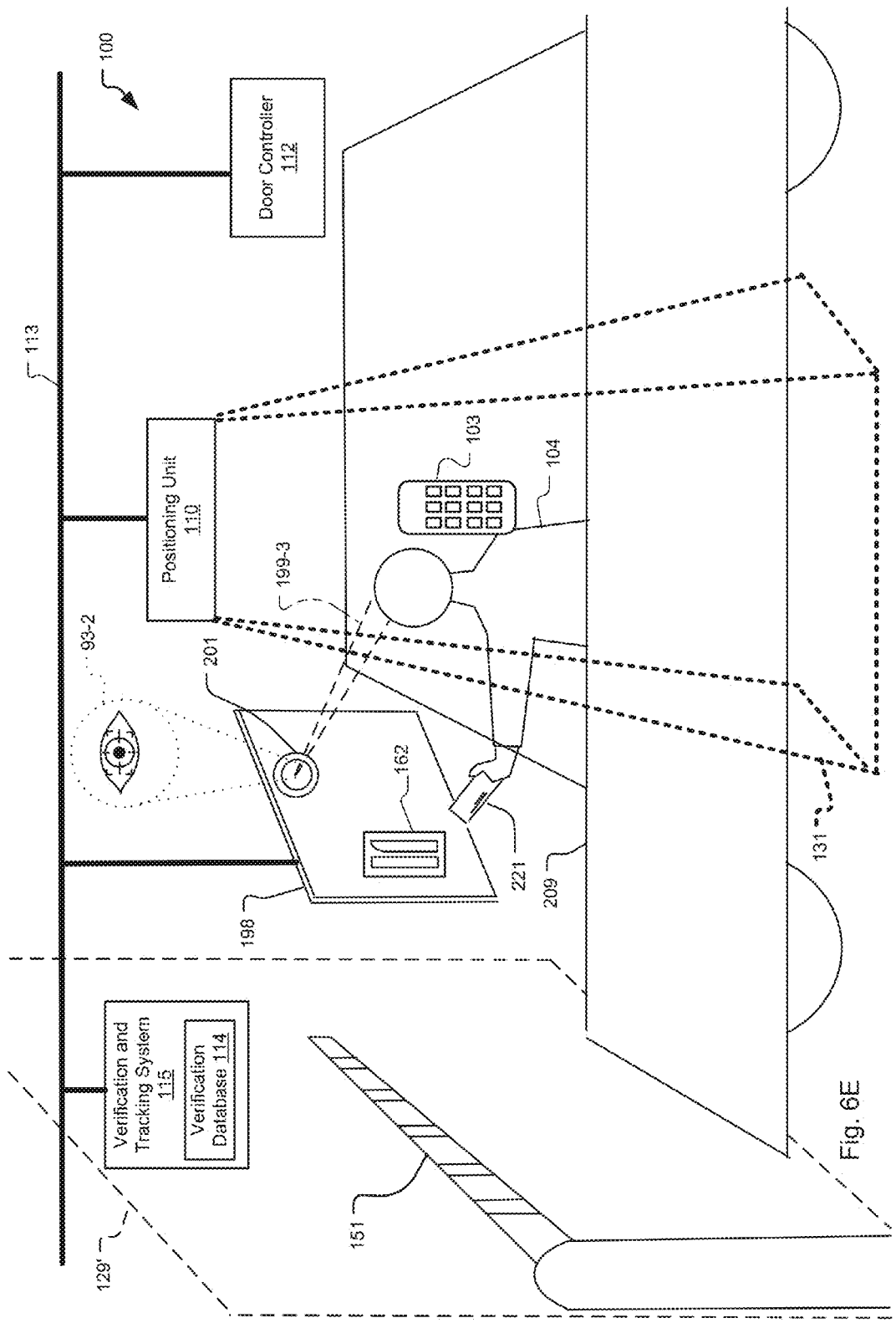
FIG. 6E is a schematic diagram of another embodiment of a multifactored access control system, where the system includes multiple identification readers such as access card readers and biometric scanners such as iris scanners, and where the access control system authorizes the users and then confirms the identity of the authorized users based upon biometric verification of the users, and where the public access point of the system is a security checkpoint at an entrance to an office, government building, or warehouse, for example.

FIG. 6E is a schematic diagram of another embodiment of an access control system 100, which is another multiphase access control system 100. In this embodiment, the system 100 controls access to public access points 129' of facilities such as a government building, office building, or warehouse. The illustrated public access point 129' is a security checkpoint/guard station of an office building.

Users 104 in vehicles 209 approach the public access point 129' to access the office building. The public access point 129' includes a vehicle security gate 151. As in the embodiment of FIG. 6D, the embodiment of FIG. 6E obtains different pieces of information concerning the user 104 in different phases or steps, and uses the different pieces of information concerning the user to authorize the users, confirm the identities of the authorized users, and enable confirmed users to pass through the gate 151 of the public access point 129'.

The system 100 includes a control panel 198 that includes an integrated biometric reader 201, which here is an iris scanner, and an access card reader 162. The user 104 presents an access card 221 which includes user information 88 credentials of the user 104, such as a username/password 99 or unique ID 98. The system 100 uses information concerning the user obtained by the access card reader 162 in conjunction with the user information 88 from the user devices to authorize the user 104, and conforms the identity of the authorized user via the biometric identifier 93-2 obtained from the user 104 by the iris scanner 201. An iris scanner 201 is typically a specialized video camera with a narrow field of view 199-3 that executes multiple scans of a person's iris to obtain an iris scan biometric identifier 93-2 of the user. As in the embodiment of FIG. 6D, the biometric identifier 93 of the user 104 is obtained when the user 104 is included within a threshold area 131 of the public access point 129'.

In another example, the vehicle 209 can be a passenger ferry or boat. In this example, the biometric readers 201 and other information readers can be included within the vehicle 209. Vehicles 209 that include such a multifactored access control system can also be thought of as "smart transportation devices." Examples of smart transportation devices include airplanes, buses, and trains, or any other vehicle 209 that accepts passenger users 104, and where authorizing multiple pieces of information concerning the users 104 is required as a condition for granting access to the vehicles 209.

Figure 7A:
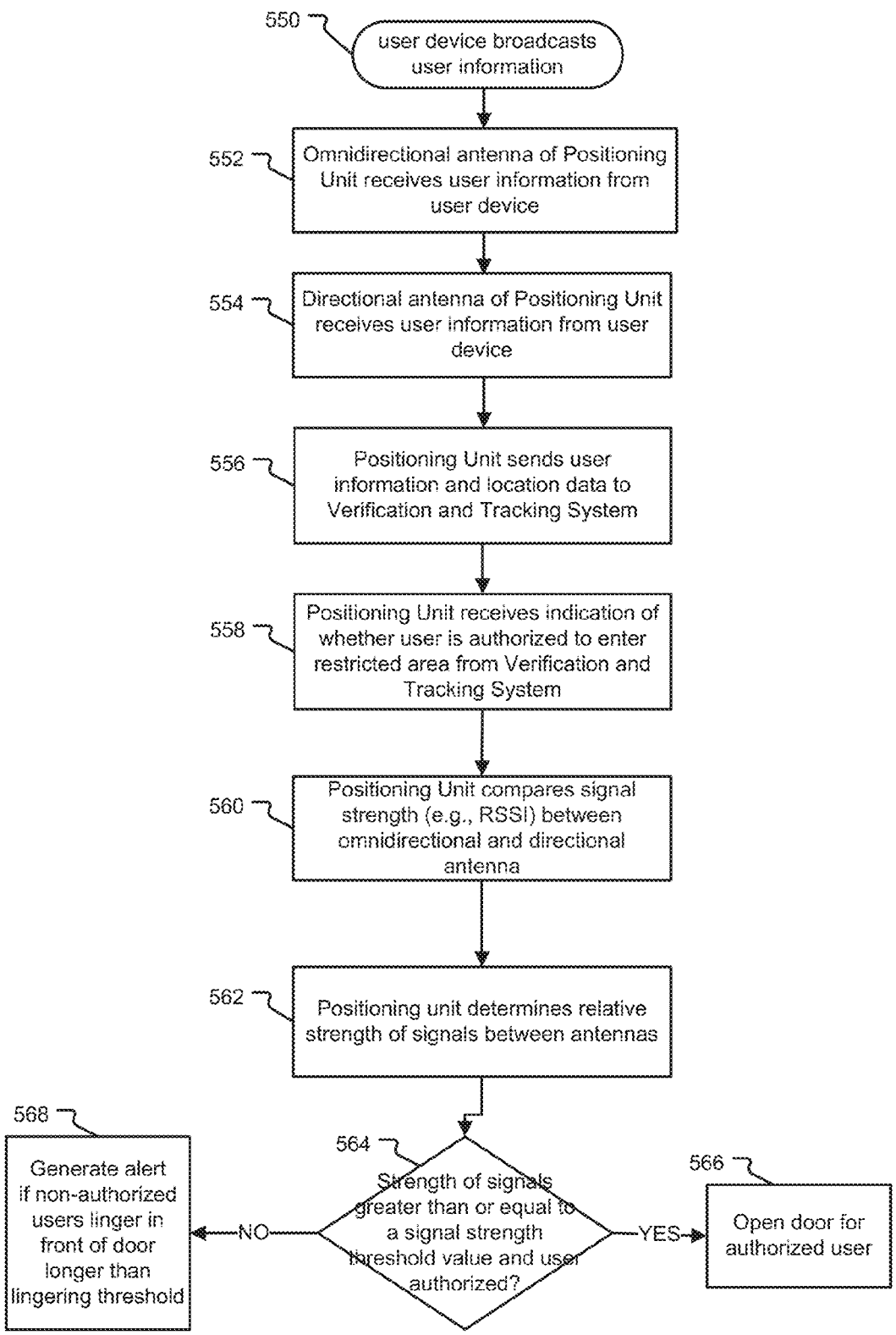
FIG. 7A is a flowchart illustrating how the positioning unit tracks a user by determining the location of a user based on the signal characteristics of a mobile active wireless user device carried by the user.

FIG. 7A is a flowchart illustrating how the positioning unit 110 determines the location of a user based on the signal characteristics of the mobile broadcasting user device 103.

In a typical implementation, the positioning unit 110 determines if the origin of the signal (e.g., the fob 103-$f$ currently broadcasting its user information) is directly beneath the positioning unit 110 and enclosure 127 and in the volumetric region above the threshold area 131 defined by the aperture of the directional antenna 111-$b$. This is accomplished by comparing the signal strength of the two antennas (i.e., the omnidirectional antenna and the directional antenna). By comparing the strength of the received wireless signals between the two antennas 111-$a$, 111-$b$, the positioning unit 110 determines if the user devices 103 and thus the users 104 are in close proximity to the door 129 (i.e., in the threshold area 131).

For example, wireless signals sent from a user device within the threshold area 131 will likely be detected by both the primary (i.e. omnidirectional 111-$a$) and directional antenna 111-$b$ and will be among the highest in signal strength. Because each of the antennas have received a wireless signal from the same device with a high signal strength as compared to threshold/expected values, the positioning unit can infer that the user device 103 is likely located within the threshold area 131. In addition, wireless signals that are relatively the same in strength as determined by the antennas 111-$a$/111-$b$ but each have a very low or weak value for their signal strength likely means that the user device 103 is also within the threshold area 131. In one example, this could occur when the user device 103 is not within clear line of sight with the positioning unit 110, such as when placed in a rear pocket of pants worn by the user 104 or when placed in a backpack worn by the user 104, in examples, due to the resultant radio frequency shielding. Finally, signals sent from a user device located perhaps 3 or 15 meters or more away from the positioning unit 110 will either be very weak or undetected by the directional antenna 111-b, but will likely be detected by the omnidirectional antenna 111-b. This is because the signals are well within the signal range of the omnidirectional antenna 111-b. Because the directional antenna 111-b receives a weak signal or no signal and the omnidirectional antenna 111-a receives a signal with a nominal strength after comparing its signal strength to threshold/expected values, the positioning unit can infer that the user device 103 is likely located away from the threshold area 131.

In step 550, the user device 103 broadcasts user information 88. Next, the primary antenna (functioning as an omnidirectional antenna 111-a) of the positioning unit 110 receives user information 88 from the user device 103 in step 552. The directional antenna 111-b of the positioning unit 110 also receives user information from the user device 103 in step 554.

The positioning unit 110 sends the user information 88 and location data 109 to the verification and tracking system 115 in step 556. In step 558, the positioning unit 110 receives an indication of whether the user 104 is authorized to enter the restricted area from the verification and tracking system 115.

In step 560, the positioning unit 110 compares the signal strength between the omnidirectional 111-a antenna and the directional antenna 111-b. Next, the positioning unit 110 determines the relative strength of the signals between the antennas in step 562.

In step 564, the positioning unit 110 determines if the signal strength is greater than or equal to a predetermined signal strength threshold value. The relative strength of the signals between the antennas is indicative of the user being in the threshold and whether the user 104 was authorized by the verification and tracking system 115. In general, as the fob 103 moves toward the threshold area 131 in front of door access point 129, the signal strength approaches its maximum value and the difference in signal strength received by the two antennas 111-a, 111-b diminishes. Once the signal strength meets or exceeds the predetermined signal strength threshold value and/or the signal strength difference between antennas 111-a, 111-b has decreased below a difference threshold, then the user device 103 (and therefore the user 104) are determined to be within the threshold area 131 in front of the door 129.

If step 564 resolves to true, then the positioning unit 110 sends a signal to the door controller 112 to unlock the door access point 129 for the authorized user 104 in step 566. In some examples, the positioning unit waits to unlock the door until the authorized user 104 has remained stationary in the threshold area for a wait time of greater that a second or two seconds or more. This ensures that the door is not unlocked simply because an authorized user as walked in front of or simply passed-by the door.

Otherwise, the positioning unit 110 generates an alert if the non-authorized user 104 lingers in front of the door 129 for longer than a predefined lingering threshold value, according to step 568. A typical lingering threshold value is 5 seconds. Sometimes this lingering threshold value is greater and in some cases a lower lingering threshold value is used.

Figure 7B:
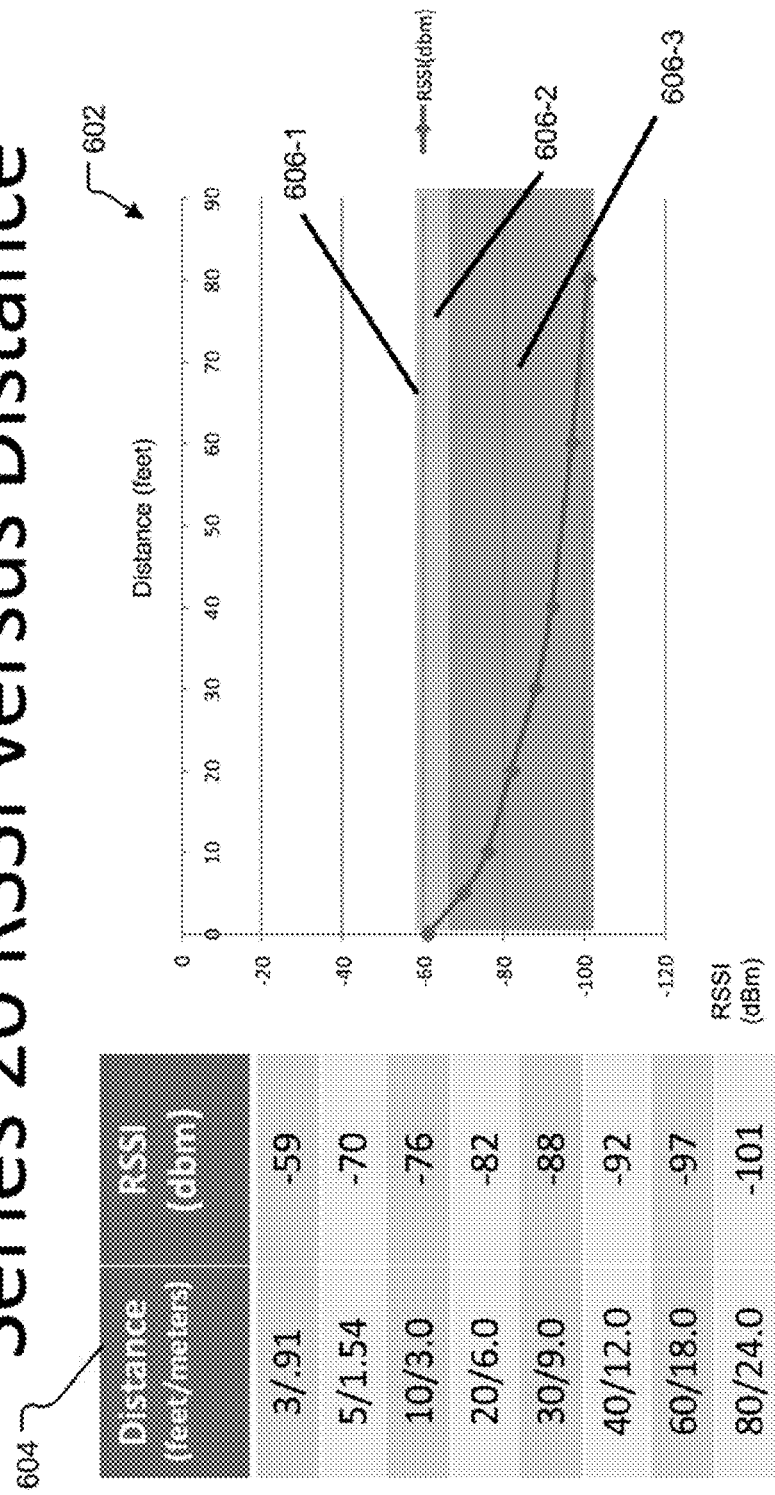
FIG. 7B shows both a graph of Received Signal Strength Indication (RSSI) vs. distance values plotted for a typical BLE user device communicating with a positioning unit, and an associated table of exemplary RSSI vs distance values from the graph, according to principles of the present invention.

FIG. 7B shows both a graph 602 of Received Signal Strength Indication (RSSI) values as a function of distance, for iBeacon and BLE112 hardware implementations of BLE, and a table 604 of exemplary RSSI vs. distance values from the graph 602. The RSSI values are in units of Decibel-milliwatts (or dbm), where the distance of the user devices 103 to the positioning unit 110 is measured in feet.

The graph 602 plots the RSSI values for both BLE112 and iBeacon-equipped iPhone user devices 103 communicating with a positioning unit 110 according to principles of the present invention. iPhone and iBeacon are registered trademarks of Apple, Inc. The graph 602 has a maximum measured distance of 27 meters. According to the iBeacon specification, wireless signals sent via iBeacon are calibrated to −59 dbm at 1 meter. Other reference parameters include a BLE specified design range of 50 meters, a BLE112 sensitivity of (−92) dbm, and an iPhone sensitivity of (−105) dbm.

The graph 602 also includes three zones 606. The first zone is the immediate zone 606-1. The immediate zone 606-1 typically encompasses the threshold area 131 and has a range of 0 to 3 feet from the door access point 129 (or approximately 0 to 1 meter). Generally, very accurate position information is obtained in the immediate zone 606-1. The second zone is the near zone 606-2. The range of the near zone 606-2 is approximately 7 to 10 feet (or 1 to 3 meters). Typically, accurate position information can also be obtained in the near zone 606-2. Finally, the third zone is the far zone 606-3, which extends from approximately 10 feet to 80 feet (approximately 3 to 24 meters). In the far zone 606-3, the positioning unit 110 is able to identify the presence of user devices 103 (or users), but the positioning information is less reliable in this zone.

Figure 8:
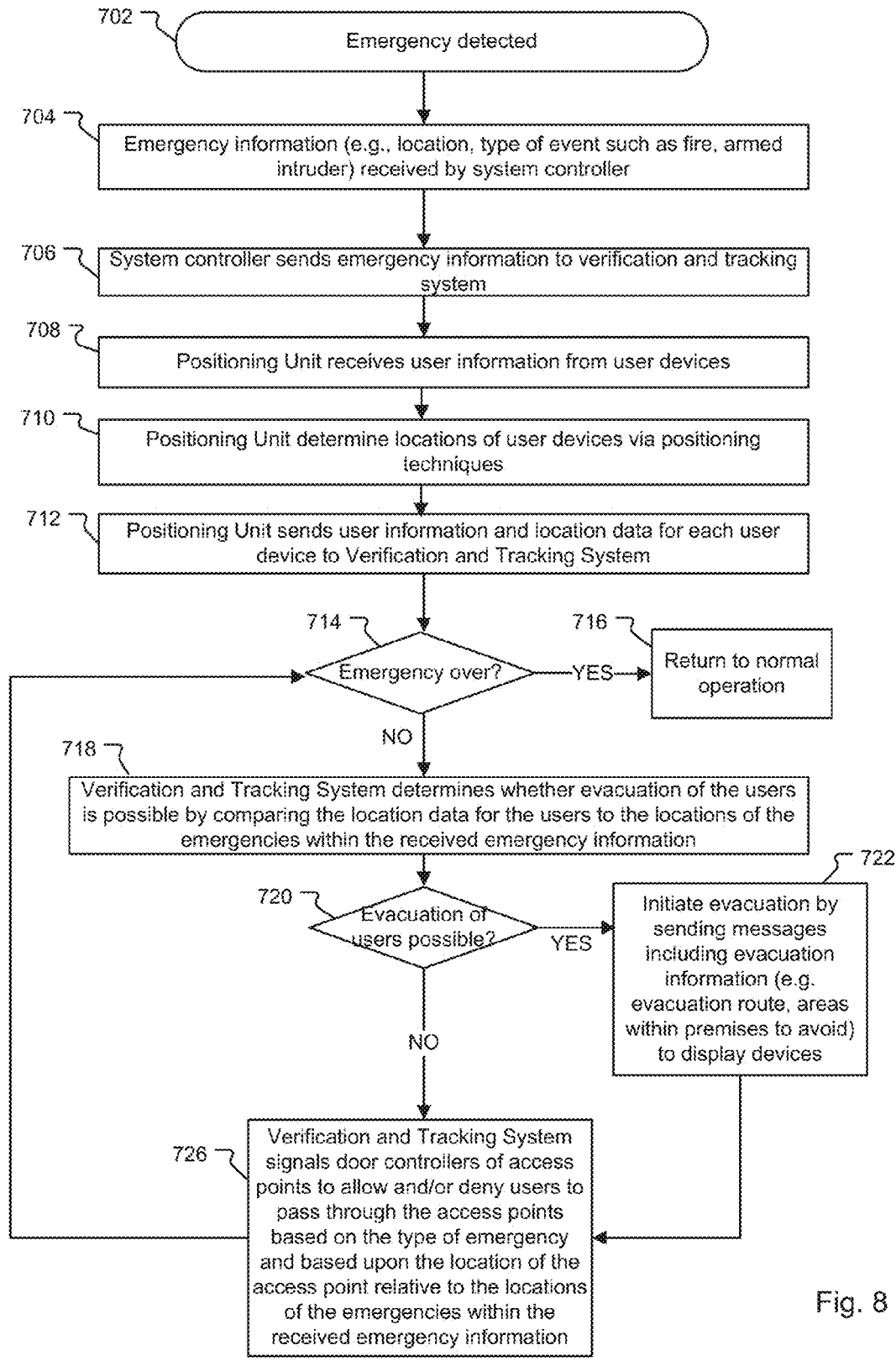
FIG. 8 is a flow diagram illustrating how the access control system is able to control access throughout a building in response to an emergency situation.

FIG. 8 is a flow diagram illustrating how the access control system 100 is able to control access throughout the building 102 in response to an emergency situation. (e.g., fire, prison riots, shooter in school, a missing child/person in store or building, chemical spill).

In step 702, the access control system 100 detects an emergency condition. This could be detected by the access control system 100, a fire alarm situation, or is manually activated by security personnel, to list a few examples. According to step 704, the system controller 118 receives emergency information concerning the emergency situation. In examples, for the emergency information includes location(s), and a types of the emergency. Types of emergencies include fire, water damage, chemical spills, prison riots, a missing child/person in store or building, and detection of an armed intruder, in examples. In step 706, the system controller 118 sends the emergency information to the verification and tracking system 115.

The positioning unit 110 receives the user information 88 from the user devices 103 in step 708. The positioning unit 115 then determines locations of user devices 103 via the positioning techniques in step 710, including determining the relative difference in signal strength of the wireless signals between two antennas and/or triangulation. According to step 712, the positioning unit 110 sends the user information 88 and the location data 109 for each fob/user device 103 to the verification and tracking system 115.

In step 714, the verification and tracking system 15 determines if the emergency is over. If this is true, the access control system 100 returns to normal operation in step 716. Otherwise, the emergency is still in progress, and the method transitions to step 718.

In step 718, the verification and Tracking System 115 determines whether evacuation of the users is possible by comparing the location data 109 for the users 104 to the locations of the emergencies within the received emergency information. If evacuation of the users is possible in step 720, the method transitions to step 722. Otherwise, the method transitions to step 726.

In step 722, because evacuation is possible, the verification and tracking system 115 initiate evacuation by sending messages including evacuation information (e.g. evacuation route, areas within premises to avoid) to display devices 117 at the access points 129 for viewing by the users 104. The messages can be audible and/or visual in nature. Additionally, as users move through the building they and are "handed off" to other positioning units 110 and additional information may be displayed on the display devices 117-1 to 117-n with further instructions as the situation develops.

In step 726, after determining that evacuation is not possible, the verification and tracking system 115 signals door controllers 112 of access points 129 to allow and/or deny users 104 to pass through the access points 129 based on the type of emergency and based upon the location of the access point relative to the locations of the emergencies within the received emergency information. In one example, the door controllers 122 send signals to lock access points 129 surrounding a threat in an attempt to contain the threat.

Finally, upon conclusion of step 726, the method transitions back to step 714 to determine if the emergency situation is still in progress.

While this invention has been particularly shown and described with references to preferred embodiments thereof, it will be understood by those skilled in the art that various changes in form and details may be made therein without departing from the scope of the invention encompassed by the appended claims.

What is claimed is:

1. An access control system for monitoring a public access point, comprising:
    a positioning unit for tracking locations of users carrying smart phone user devices relative to the public access point based on wireless signals from the smart phone user devices, wherein the positioning unit comprises a directional antenna for establishing close proximity of the smart phone user devices to the public access point and an omnidirectional antenna for receiving the wireless signals and continuously monitoring the smart phone user devices;
    wherein the access control system determines whether the users are authorized to pass through the public access point based on the wireless signals from the smart phone user devices.

2. The system of claim 1, wherein the public access point is a security checkpoint at an entrance to an office or government building or warehouse.

3. The system of claim 1, wherein the public access point is a security checkpoint at an entrance to a building of a college or university.

4. The system of claim 1, wherein the public access point is a security checkpoint at a departure terminal of an airport.

5. The system of claim 1, wherein the public access point is a security checkpoint within or prior to an airplane at a passenger loading door of an airplane.

6. The system of claim 1, wherein the public access point is an entrance kiosk at an amusement park or at a ride within the amusement park.

7. The system of claim 1, further comprising a biometric reader that obtains biometric identifiers from the authorized users.

8. The system of claim 1, wherein the access control system confirms identities of authorized users based upon biometric identifiers of the users obtained from the authorized users when the authorized users are within a threshold area of the public access point.

9. The system of claim 8, wherein the biometric identifiers of the users include fingerprint information.

10. The system of claim 8, wherein the biometric identifiers of the users include iris scanning information.

11. The system of claim 8, wherein the access control system confirms the identities of the authorized users based upon the biometric identifiers of the users by matching the biometric identifiers obtained from the users to a stored biometric identifier for each user.

12. The system of claim 8, wherein the access control system enables confirmed users to pass through the public access point.

13. The system of claim 1, further comprising a system controller including a system controller database which stores a user account for each of the users, and wherein each user account includes:
    user information;
    video identification information;
    a biometric identifier; and
    authorization information that indicates if the user can pass through the public access point.

14. The system of claim 1, wherein the access control system determines whether the users are authorized to pass through the public access point based on the wireless signals from the smart phone user devices by:
    extracting user information that identifies the users sent from wireless signals sent by the user devices;
    matching the received user information to stored user information for the users; and
    determining that the matched user information is referenced within stored authorization information for the users that indicates which users can enter the public access point.

15. A method for controlling access of users to a public access point, comprising:
    a positioning unit tracking locations of users carrying smart phone user devices relative to the public access point based on wireless signals from the smart phone user devices that are received with directional antenna for establishing close proximity of the smart phone user devices to the public access point and an omnidirectional antenna for receiving the wireless signals and continuously monitoring the smart phone user devices; and
    determining whether the users are authorized to pass through the public access point based on the wireless signals from the smart phone user devices.

16. The method of claim 15, further comprising the public access point being a security checkpoint at an entrance to an office or government building or warehouse.

17. The method of claim 15, further comprising the public access point being a security checkpoint at an entrance to a building of a college or university.

18. The method of claim 15, further comprising the public access point being a security checkpoint at a departure terminal of an airport.

19. The method of claim 15, further comprising the public access point being a security checkpoint within or prior to an airplane at a passenger loading door of an airplane.

20. The method of claim 15, further comprising the public access point being an entrance kiosk at an amusement park or at a ride within the amusement park.

21. The method of claim 15, further comprising obtaining biometric identification from the users.

22. The method of claim 15, further comprising confirming identities of authorized users based upon biometric identifiers of the users obtained from the authorized users when the authorized users are within a threshold area of the public access point.

23. The method of claim 22, further comprising the biometric identifiers of the users including fingerprint information of the users.

24. The method of claim 22, further comprising the biometric identifiers of the users including iris scanning information of the users.

25. The method of claim 22, further comprising confirming the identities of the authorized users based upon the biometric identifiers of the users by matching the biometric identifiers obtained from the users to a stored biometric identifier for each user.

26. The method of claim 22, further comprising enabling confirmed users to pass through the public access point.

27. The method of claim 15, wherein determining whether the users are authorized to pass through the public access point based on the wireless signals from the smart phone user devices comprises:
receiving user information that identifies the users sent from the positioning unit, which the positioning unit extracts from wireless signals sent by the smart phone user devices;
matching the received user information to stored user information for the users; and
determining that the matched user information is referenced within stored authorization information for the users that indicates which users can pass through the public access point.

28. An access control system for assisting in evacuation of a premises, comprising:
a positioning unit for tracking locations of individuals carrying smart phone user devices relative to access points of the premises, wherein the positioning unit tracks the locations of the individuals based on wireless signals from the smart phone user devices, wherein the positioning unit comprises a directional antenna for establishing close proximity of the smart phone user devices to the public access point and an omnidirectional antenna for receiving the wireless signals and continuously monitoring the smart phone user devices;
wherein the access control system allows and/or denies the individuals to pass through the access points based on emergency information concerning the premises.

29. The system of claim 28, wherein the emergency information concerning the premises includes:
a type of emergency; and
one or more locations of the emergency within the premises.

30. The system of claim 28, wherein the access control system allows and/or denies the individuals to pass through the access points based on emergency information concerning the premises by:
referencing, within the emergency information, a type of emergency, and one or more locations of the emergency within the premises;
comparing the locations of the individuals to the locations of the emergencies within the premises; and
allowing and/or denying the individuals to pass through the access points based on the type of the emergency and the locations of the emergencies within the premises.

31. A method for an access control system that assists in evacuation of a premises, comprising:
a positioning unit tracking locations of individuals carrying user devices relative to access points of the premises, wherein the positioning unit tracks the locations of the individuals based on wireless signals from the user devices that are received with a directional antenna for establishing close proximity of the smart phone user devices to the public access point and an omnidirectional antenna for receiving the wireless signals and continuously monitoring the smart phone user devices; and
the access control system allowing and/or denying the individuals to pass through the access points based on emergency information concerning the premises to facilitate the evacuation of the premises by the individuals.

* * * * *